United States Patent
Nakamura

(10) Patent No.: US 11,313,629 B2
(45) Date of Patent: Apr. 26, 2022

(54) LATENT HEAT STORAGE BUILDING ELEMENT

(71) Applicant: Yazaki Energy System Corporation, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 7 days.

(21) Appl. No.: 16/911,555

(22) Filed: Jun. 25, 2020

(65) Prior Publication Data

US 2020/0326138 A1    Oct. 15, 2020

Related U.S. Application Data

(63) Continuation of application No. PCT/JP2018/045334, filed on Dec. 10, 2018.

(30) Foreign Application Priority Data

Dec. 26, 2017  (JP) .............................. JP2017-248820

(51) Int. Cl.
| | |
|---|---|
| F28D 20/02 | (2006.01) |
| F24D 11/00 | (2022.01) |
| E04C 2/36 | (2006.01) |
| F24F 5/00 | (2006.01) |
| F24H 7/02 | (2022.01) |

(52) U.S. Cl.
CPC ............. *F28D 20/023* (2013.01); *E04C 2/36* (2013.01); *F24D 11/006* (2013.01); *F24F 5/0075* (2013.01); *F24H 7/02* (2013.01)

(58) Field of Classification Search
CPC ...... F28D 20/023; F28D 20/028; F28D 20/02; F28D 20/021; F28D 20/025; F28D 20/026; F28D 2021/0061; F24D 11/006; E04C 2/36; E04C 2/54; E04C 2/34; E04C 2/525;
(Continued)

(56) References Cited

U.S. PATENT DOCUMENTS

| | | | |
|---|---|---|---|
| 6,319,599 B1 * | 11/2001 | Buckley | .................... B32B 7/02 36/83 |
| 10,094,622 B2 * | 10/2018 | Honda | .................. F28D 20/028 |

(Continued)

FOREIGN PATENT DOCUMENTS

| | | |
|---|---|---|
| CN | 107202513 A | 9/2017 |
| DE | 102008040281 A1 | 1/2010 |

(Continued)

OTHER PUBLICATIONS

Communication dated Jan. 29, 2021 issued by the European Patent Office in application No. 18893787.4.

*Primary Examiner* — Frantz F Jules
*Assistant Examiner* — Martha Tadesse
(74) *Attorney, Agent, or Firm* — Sughrue Mion, PLLC

(57) ABSTRACT

A latent heat storage window includes a plurality of cells, an operation mechanism, and a magnetic material. The plurality of cells are formed by encapsulating a latent heat storage material including two or more components. The operation mechanism can be operated by a user. The magnetic material causes a specific component of the two or more components included in the latent heat storage material to be unevenly distributed when the operation mechanism is operated.

8 Claims, 15 Drawing Sheets

(58) Field of Classification Search
CPC ... F24F 5/0075; F24F 2005/0078; F24H 7/02; F28F 23/02
See application file for complete search history.

(56) References Cited

U.S. PATENT DOCUMENTS

| | | | |
|---|---|---|---|
| 10,902,875 B2* | 1/2021 | Kagawa | G11B 5/73929 |
| 2002/0164473 A1* | 11/2002 | Buckley | A61F 7/02 |
| | | | 2/93 |
| 2004/0081490 A1* | 4/2004 | Terada | G03G 15/2064 |
| | | | 399/328 |
| 2007/0125095 A1* | 6/2007 | Iwasaki | F25B 21/00 |
| | | | 62/3.1 |
| 2011/0167838 A1* | 7/2011 | Danner | H01L 23/3736 |
| | | | 62/3.1 |
| 2015/0345874 A1* | 12/2015 | Honda | F28D 20/028 |
| | | | 165/10 |
| 2017/0268802 A1 | 9/2017 | Machida et al. | |

FOREIGN PATENT DOCUMENTS

| | | | | |
|---|---|---|---|---|
| JP | 2002-130739 A | | 5/2002 | |
| JP | 2011-174656 A | | 9/2011 | |
| JP | 2013-23977 A | | 2/2013 | |
| JP | 2013023977 A | * | 2/2013 | |
| JP | 2014016060 A | * | 1/2014 | |
| JP | 2014016060 A | | 1/2014 | |
| JP | 2016-6370 A | | 1/2016 | |
| JP | 2016006370 A | * | 1/2016 | ........... F28D 20/028 |
| JP | 2016030964 A | * | 3/2016 | |
| JP | 2017-48943 A | | 3/2017 | |
| JP | 2017048943 A | * | 3/2017 | |
| WO | WO-2011012685 A2 | * | 2/2011 | ............... F24H 7/02 |

* cited by examiner

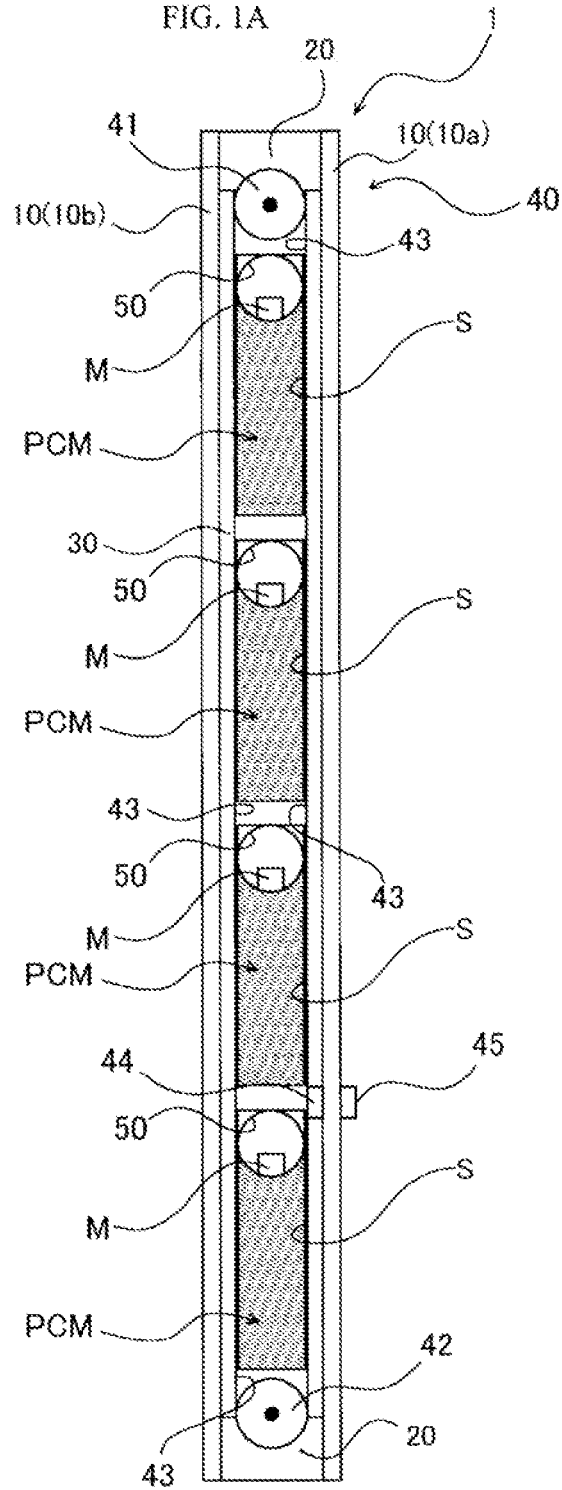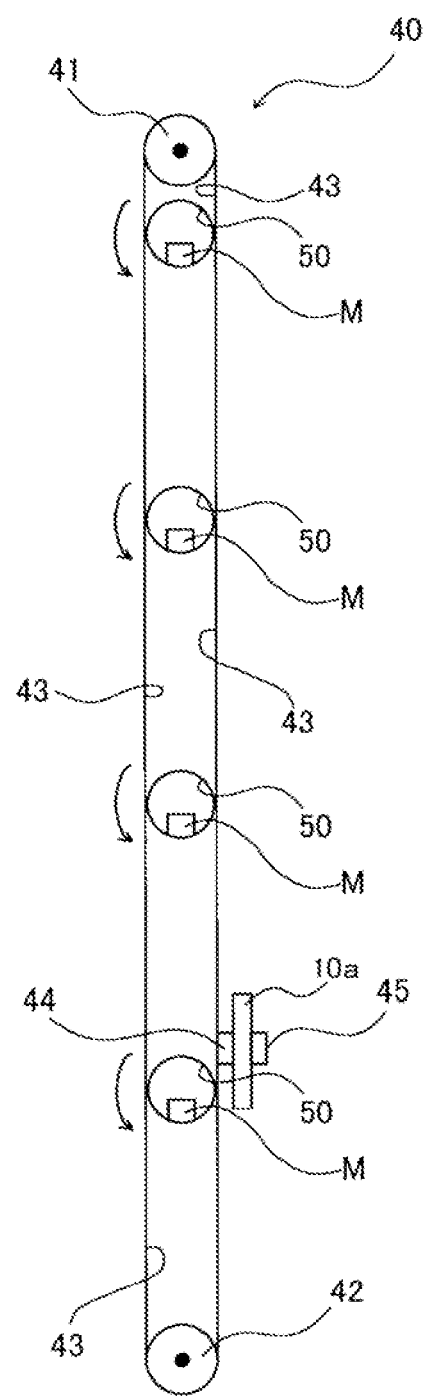

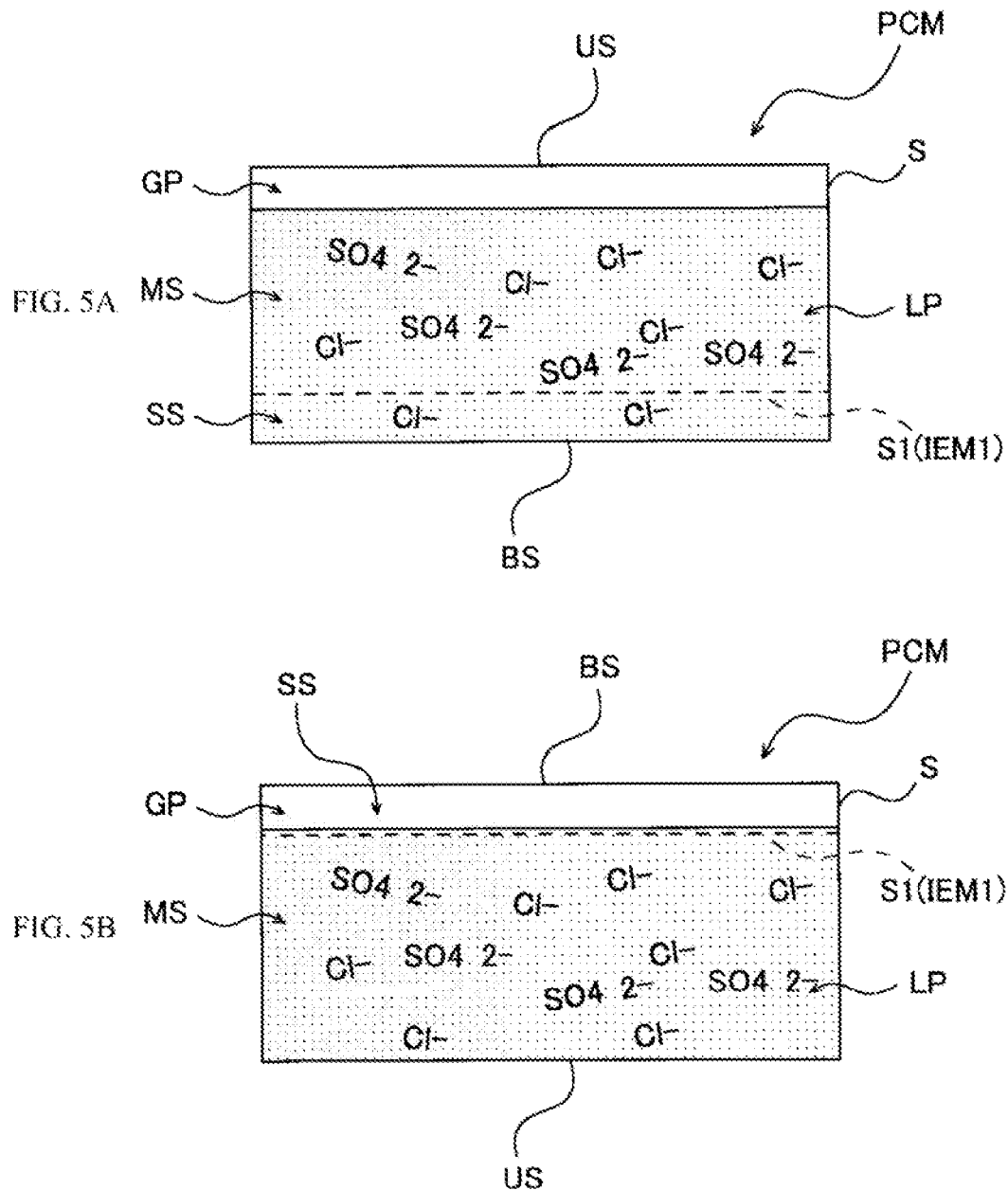

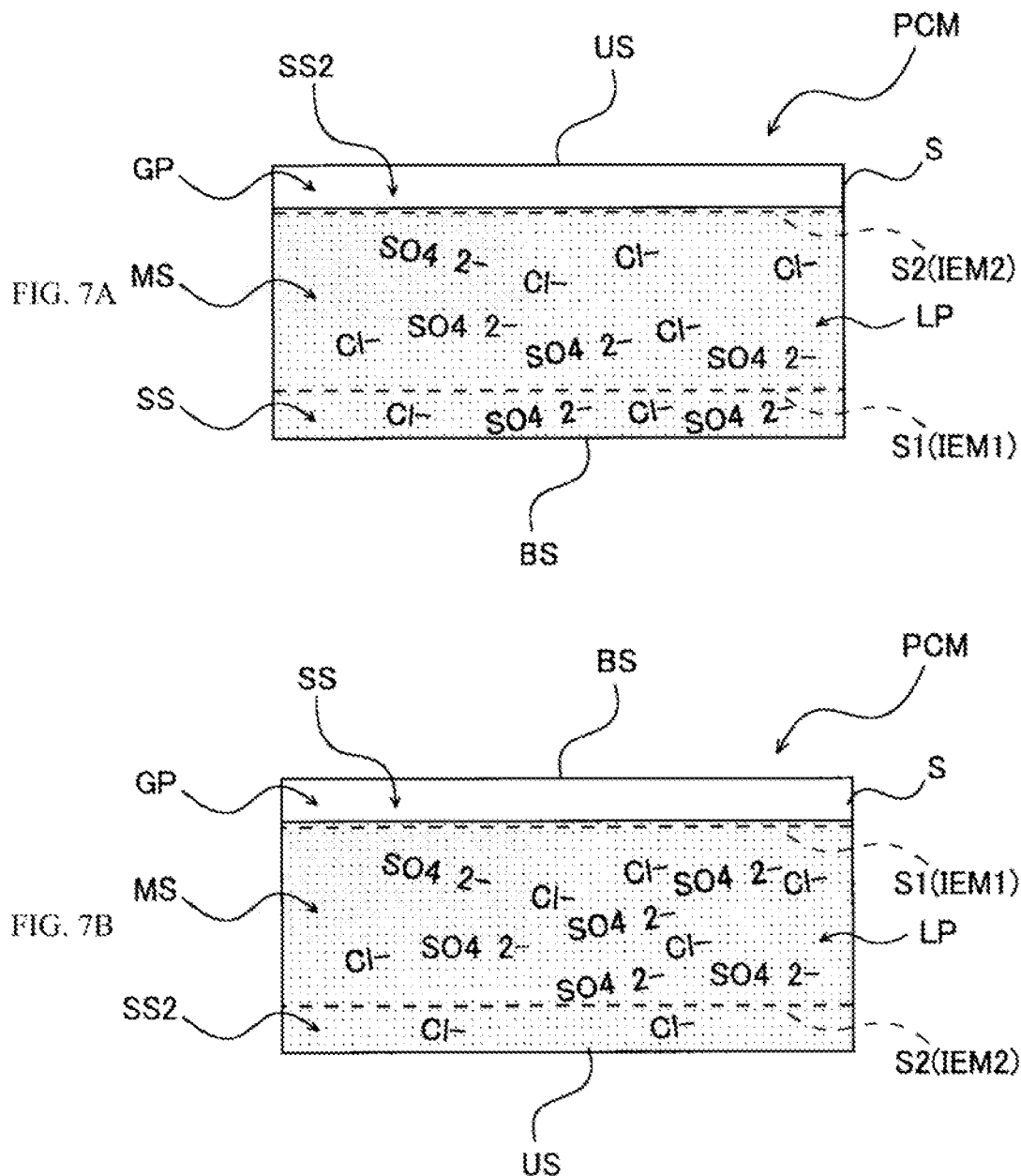

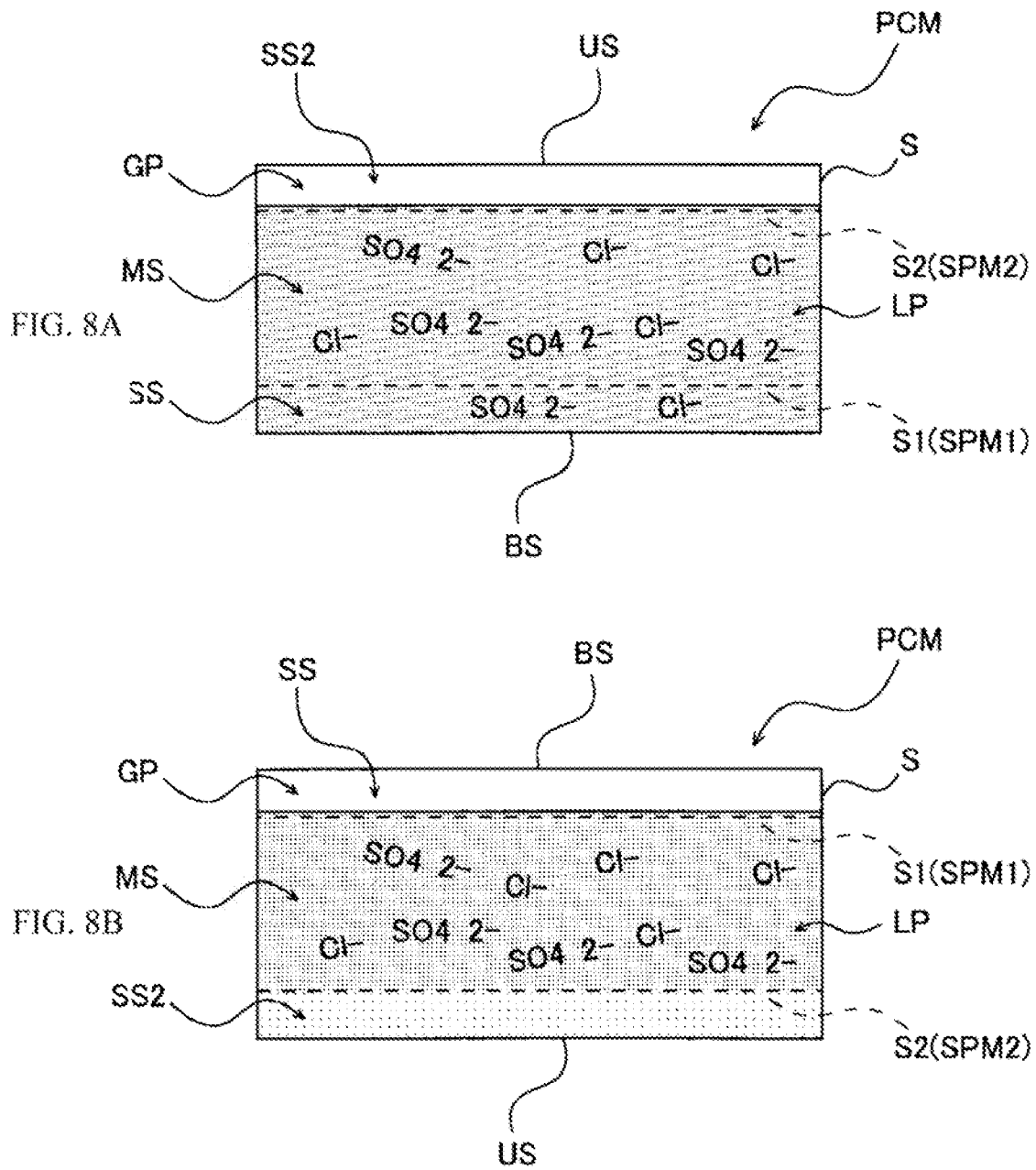

LATENT HEAT STORAGE BUILDING ELEMENT

CROSS-REFERENCE TO RELATED APPLICATIONS

This is a continuation of International Application No. PCT/JP2018/045334 filed on Dec. 10, 2018, and claims priority from Japanese Patent Application No. 2017-248820 filed on Dec. 26, 2017, the entire content of which is incorporated herein by reference.

TECHNICAL FIELD

The present invention relates to a latent heat storage building element including a latent heat storage material capable of adjusting a phase change temperature.

BACKGROUND ART

In a related art, proposed are many technologies of providing a latent heat storage material in an attic of a building, a floor material, a wall material, and indoor furnishings, and of providing indoor air temperature adjustment. In a mid-latitude region, cooling is required in the summer and heating is required in the winter. A target temperature level for adjusting a temperature of an indoor space is substantially constant even in both heating and cooling, and is about 18° C. to 26° C., more desirably about 20° C. to 24° C. In order to adjust the indoor air to such a temperature range by heat radiation and heat absorption from the heat storage material, a certain temperature difference between the indoor air and the heat storage material is required, and an ideal heat storage temperature to be used for cooling is lower than 20° C. to 24° C., and an ideal heat storage temperature to be used for heating is higher than 20° C. to 24° C.

However, when a latent heat storage material having a phase change temperature is used in such a temperature range, there is a problem that an effect rapidly deteriorates when a temperature of the indoor air to be air-conditioned approaches a comfort region to some extent. Therefore, proposed is a cooling and heating device that includes a latent heat storage material having a phase change temperature of about 26° C. or higher for the purpose of heating and a latent heat storage material having a phase change temperature of about 18° C. or lower for the purpose of cooling, and that uses the above-described latent heat storage materials for the air-conditioning according to the season (refer to PTL 1, for instance).

PTL 1 is JP-A-2011-174656.

SUMMARY OF INVENTION

However, in the cooling and heating device described in PTL 1, since the latent heat storage material for cooling and the latent heat storage material for heating are provided, the total weight and volume become excessively large.

Aspect of non-limiting embodiments of the present disclosure relates to provide a latent heat storage building element that is not required to include a latent heat storage material for cooling and a latent heat storage material for heating and that can self-adjust a phase change temperature.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a latent heat storage building element including a plurality of cells, an operation unit, and an uneven distribution unit. The plurality of cells are formed by encapsulating a latent heat storage material including two or more components. The operation unit can be operated by a user. The uneven distribution unit causes a specific component of the two or more components included in the latent heat storage material to be unevenly distributed when the operation unit is operated.

According to the aspect, since a specific component is unevenly distributed in response to an operation by a user, it is possible not only to lower a specific component ratio at other portions excluding an uneven distribution portion but also to change a phase change temperature of a latent heat storage material, when uneven distribution is performed.

BRIEF DESCRIPTION OF DRAWINGS

Exemplary embodiment(s) of the present invention will be described in detail based on the following figures, wherein:

FIGS. 1A and 1B are configuration diagrams illustrating a latent heat storage building element according to a first embodiment of the present invention, in which FIG. 1A is an overall configuration diagram and FIG. 1B is a partial configuration diagram;

FIGS. 2A and 2B are main part configuration diagrams illustrating function of a latent heat storage window according to the first embodiment, in which FIG. 2A illustrates a state in which a magnet is close to a latent heat storage material and FIG. 2B illustrates a state in which the magnet is separated from the latent heat storage material;

FIGS. 5A and 5B are first enlarged views illustrating one of a plurality of cells according to the second embodiment, in which FIG. 5A illustrates a non-rotated state and FIG. 5B illustrates a rotated state;

FIGS. 6A and 6B are second enlarged views illustrating one of the plurality of cells according to the second embodiment, in which FIG. 6A illustrates a non-rotated state and FIG. 6B illustrates a rotated state;

FIGS. 7A and 7B are first enlarged views illustrating one of a plurality of cells according to a third embodiment, in which FIG. 7A illustrates a non-rotated state and FIG. 7B illustrates a rotated state;

FIGS. 8A and 8B are second enlarged views illustrating one of the plurality of cells according to the third embodiment, in which FIG. 8A illustrates a non-rotated state and FIG. 8B illustrates a rotated state;

FIGS. 9A and 9B are first enlarged views illustrating one of a plurality of cells according to a fourth embodiment, in which FIG. 9A illustrates a non-rotated state and FIG. 9B illustrates a rotated state;

FIGS. 10A and 10B are second enlarged views illustrating one of the plurality of cells according to the fourth embodiment, in which FIG. 10A illustrates a non-rotated state and FIG. 10B illustrates a rotated state;

DESCRIPTION OF EMBODIMENTS

Figure 2A:
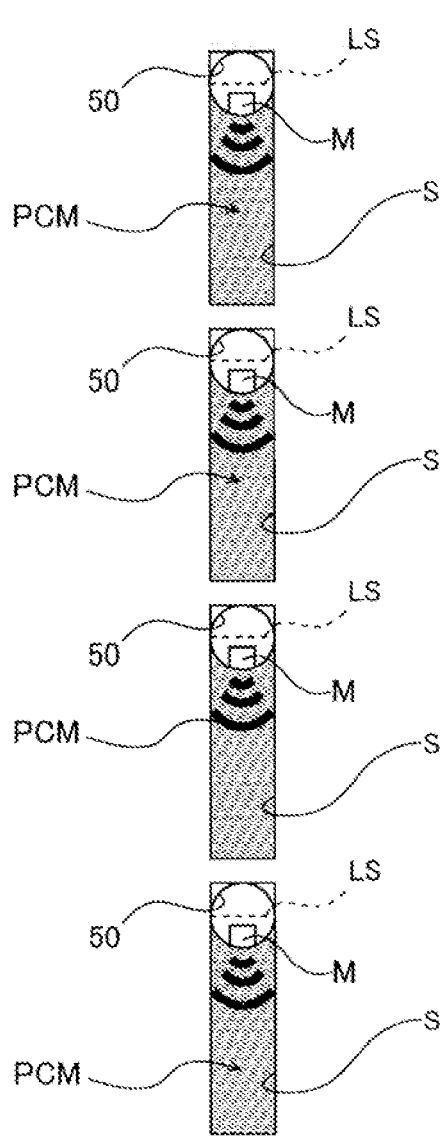

Hereinafter, the present invention will be described with reference to preferred embodiments. The present invention is not limited to the embodiments described below, and can be appropriately modified within a range not departing from the spirit of the present invention. In the embodiments described below, there may be a portion in which a part of configuration will not be illustrated and description thereof will be omitted, but with respect to details of an omitted technology, it goes without saying that a publicly known or well-known technology is appropriately applied within a range not causing inconsistency with a content described below.

FIGS. 1A and 1B are configuration diagrams illustrating a latent heat storage building element according to a first embodiment of the present invention, in which FIG. 1A is an overall configuration diagram and FIG. 1B is a partial configuration diagram. Hereinafter, a latent heat storage window applicable as a window (regardless of whether the window is opened or closed) will be described as an example of a latent heat storage building element, and the latent heat storage building element is not limited to the one applied to the latent heat storage window, but may be an outer wall material that does not function as a window. The latent heat storage building element may be used on the ceiling and under the floor.

A latent heat storage window 1 according to the example illustrated in FIG. 1A includes a first plate material 10a and a second plate material 10b which are roughly two sheets of a plate material 10, a peripheral end member 20, a cell array plate material 30, an operation mechanism (operation unit) 40, and a magnet cylinder 50.

The two sheets of the plate material 10 are transparent plate materials disposed substantially in parallel with each other. For example, these plate materials 10 are configured of a glass material. The peripheral end member 20 is interposed between the two sheets of the plate material 10 at peripheral end parts of the two sheets of the plate material 10. An internal space closed by the two sheets of the plate material 10 and the peripheral end member 20 is formed by providing the peripheral end member 20 at the peripheral end parts of the two sheets of the plate material 10.

The cell array plate material 30 is provided in the internal space formed by the two sheets of the plate material 10 and the peripheral end member 20. The cell array plate material 30 is a plate material in which a plurality of gap portions serving as a plurality of cells S are arranged in a vertical direction. A transparent latent heat storage material PCM is encapsulated in each cell S.

The latent heat storage material PCM has two or more components, and for example, the latent heat storage material PCM is configured of one including two components of $Na_2SO_4 \cdot 10H_2O$ and a freezing point depressant. In the embodiment, the freezing point depressant is a component that has magnetism and is dispersed, and includes, for example, 1-butyl-3-methylimidazolium tetrachlorodisprosate of a water-soluble magnetic ionic liquid having tetrachlorodisprosate as anion described in JP-A-2007-131608. Although such water-soluble ionic liquid is dispersed as an ionized ion in water, it is considered that anion ($DyCl_4^-$) and cation ($BMIM^+$) are kept close to each other, and for convenience, $DyCl_4^-$ having magnetism will be hereinafter described.

In the embodiment, the cell array plate material 30 is a ladder-shaped cross-section material in which the cells S are disposed in a line in the vertical direction, but is not limited thereto, and a honeycomb cross-section material in which the gap portions serving as the cells are arranged in a honeycomb shape vertically and horizontally may be adopted. That is, the cell array plate material 30 is not limited to the above-described material as long as the latent heat storage material can be held.

The operation mechanism 40 operates the magnet cylinder 50, and as illustrated in FIGS. 1A and 1B, includes an upper pulley 41, a lower pulley 42, a ladder cord (cord member) 43, an internal magnet 44, and an external magnet 45. The upper pulley 41 and the lower pulley 42 are pulley members respectively provided on the upper side and the lower side of the latent heat storage window 1. The ladder cord 43 is an endless string member wound around the upper pulley 41 and the lower pulley 42. The ladder cord 43 is connected to opposite sides of the magnet cylinder 50 (both sides of the first plate material 10a and the second plate material 10b) and is in a state of being indirectly connected to a magnet M which will be described later.

The internal magnet 44 is a magnet member disposed in the internal space formed by the two sheets of the plate material 10 and the peripheral end member 20, and is connected to the ladder cord 43. The external magnet 45 attracts the internal magnet 44 via one plate material 10a (only a part of the plate material 10 is illustrated in FIG. 1B). For example, the internal magnet 44 and the external magnet 45 are formed of a strong magnet such as a neodymium magnet.

The magnet cylinder 50 is a cylinder in which the magnet M is attached to an inner wall. As illustrated in FIG. 1A, this magnet cylinder 50 is disposed on the upper side in the cell S. An upper part of the cell S is in a gas phase. Therefore, when the latent heat storage material PCM is in a liquid state, a lower half portion of the magnet cylinder 50 is immersed in the latent heat storage material PCM, and an upper half portion thereof is not immersed in the latent heat storage material PCM.

In the above-described latent heat storage window 1, when a user moves the external magnet 45 upward, the internal magnet 44 attracted to the external magnet 45 also moves upward. Since the internal magnet 44 is connected to the ladder cord 43, the ladder cord 43 rotates along the upper pulley 41 and the lower pulley 42, and rotates the magnet cylinder 50 by a horizontal blind system. Accordingly, the magnet M in the magnet cylinder 50 can be immersed (closed thereto) in the latent heat storage material PCM or can be prevented from being immersed (separated therefrom) therein.

Figure 2B:
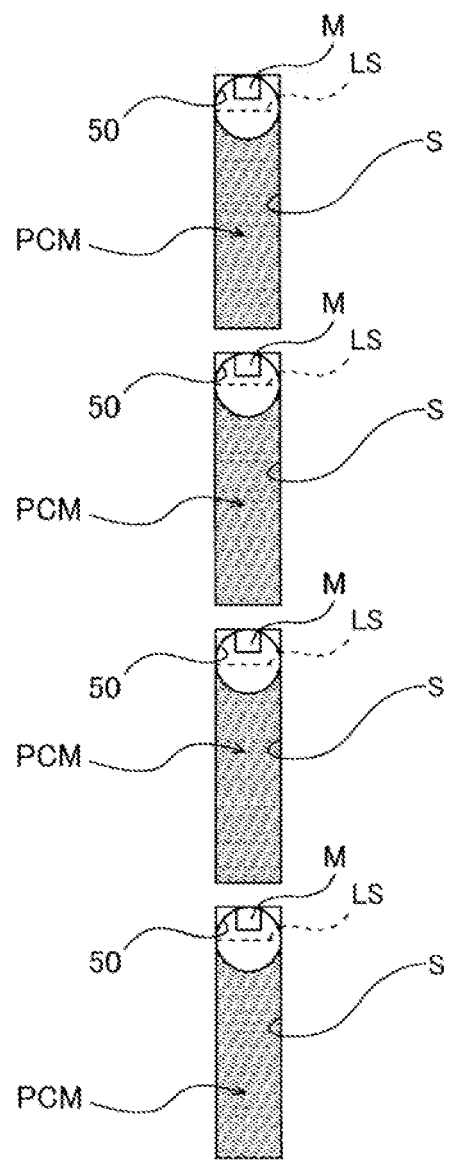

Next, function of the latent heat storage window 1 according to the first embodiment will be described. FIGS. 2A and 2B are main part configuration diagrams illustrating function of the latent heat storage window 1 according to the first embodiment, in which FIG. 2A illustrates a state in which the magnet M is close to the latent heat storage material PCM and FIG. 2B illustrates a state in which the magnet M is separated from the latent heat storage material PCM.

First, as illustrated in FIG. 2A, it is assumed that the external magnet 45 of the operation mechanism 40 (refer to FIG. 1) is operated and the magnet M of the magnet cylinder 50 is located below a liquid level LS of the latent heat storage material PCM. In this case, the magnet M is close to the latent heat storage material PCM, and its magnetic three acts on a dysprosium tetrachloride ion ($DyCl_4^-$) which is a component having magnetism in the latent heat storage material PCM. Therefore, the dysprosium tetrachloride ion ($DyCl_4^-$) is in a state of being unevenly distributed on the side of the magnet M, and the concentration of the freezing point depressant is lowered at a portion excluding the vicinity of the magnet M in the latent heat storage material PCM. As a result, a melting point and a freezing point of the latent heat storage material PCM (phase change temperature) can be increased to, for example, about 26° C., whereby the latent heat storage window 1 can function as that for the winter.

As illustrated in FIG. 2B, it is assumed that the external magnet 45 of the operation mechanism 40 (refer to FIG. 1) is operated and the magnet M of the magnet cylinder 50 is located above the liquid level LS of the latent heat storage material PCM. In this case, the magnet M is separated from the latent heat storage material PCM, and its magnetic force becomes hard to act on the dysprosium tetrachloride ion ($DyCl_4^-$). Therefore, the dysprosium tetrachloride ion ($DyCl_4^-$) is in a state of being dispersed in the latent heat storage material PCM. Accordingly, the freezing point depressant is caused to act as usual, and the freezing point of the latent heat storage material PCM can be lowered to, for example, about 18° C., whereby the latent heat storage window 1 can function as that for the summer.

As described above, according to the latent heat storage window 1 of the first embodiment, since the dysprosium tetrachloride ion ($DyCl_4^-$) which is a specific component is unevenly distributed in response to an operation by a user, it is possible not only to lower a specific component ratio at other portions excluding an uneven distribution portion but also to change the melting point and the freezing point of the latent heat storage material PCM, when uneven distribution is performed.

The magnet M is provided, the latent heat storage material PCM includes a component such as the dysprosium tetrachloride which has magnetism and is dispersed, and it is possible to switch between a state in which the magnet M is caused to be close to the latent heat storage material PCM and a state in which the magnet M is caused to be separated therefrom in response to the operation by the user. Therefore, in the state where the magnet M is caused to be close thereto and the magnetic force is caused to act, the component having magnetism is caused to be adsorbed to the magnet M, whereby the component ratio of the latent heat storage material PCM at the portion excluding the vicinity of the magnet M can he adjusted. Accordingly, the melting point and the freezing point of the latent heat storage material PCM can be changed.

The ladder cord 43 that operates in response to the operation by the user is provided, and the magnet M is switched between the state of being close to the latent heat storage material PCM and the state of being separated therefrom in response to the operation of the ladder cord 43. Therefore, the melting point and the freezing point of the latent heat storage material PCM can be changed by using the ladder cord 43 which is a member that can be routed even in a narrow gap.

In the first embodiment, the latent heat storage material PCM may not include the component that has magnetism and is dispersed as the freezing point depressant, and the component may be provided as one component of the latent heat storage material. The latent heat storage material PCM is not limited to the two components, and may be formed of three or more components.

Next, a second embodiment of the present invention will be described. A latent heat storage window according to the second embodiment has the following configuration. Hereinafter, in the description of the second embodiment, the same or similar elements as those of the first embodiment will be denoted by the same reference signs.

Figure 3:
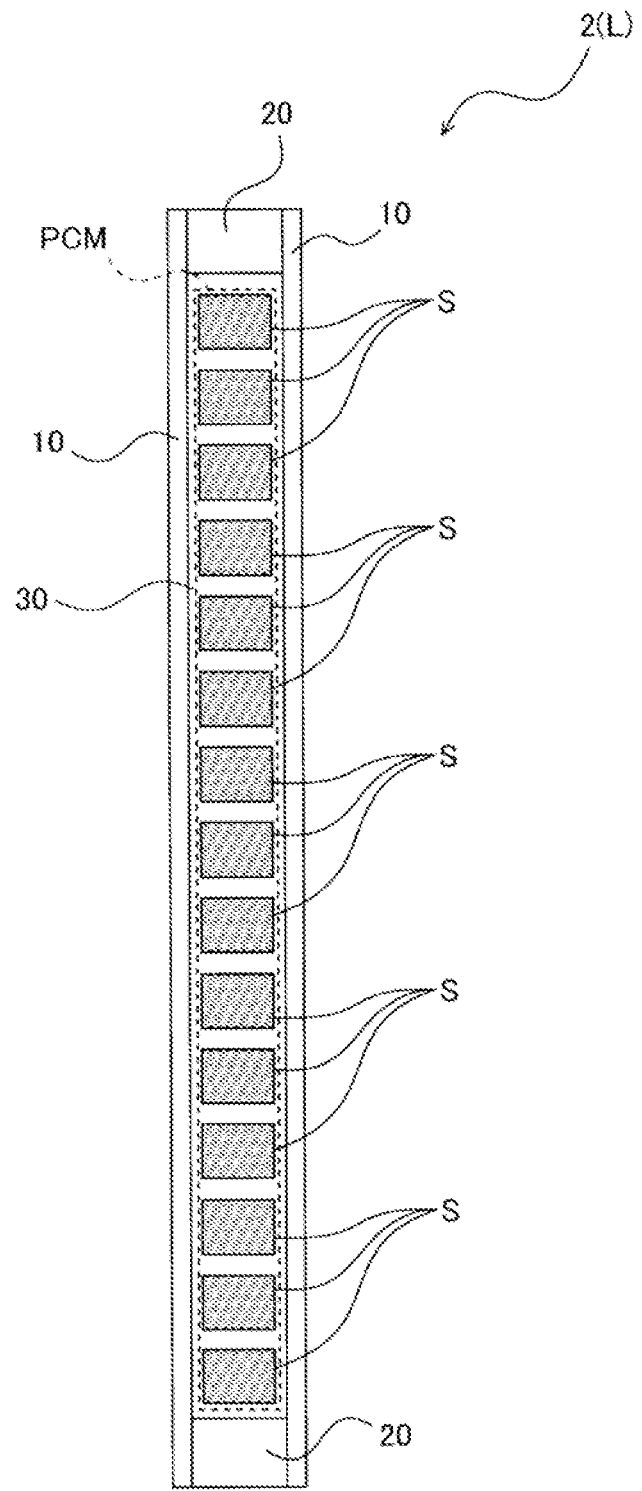
FIG. 3 is a configuration diagram illustrating a latent heat storage window according to a second embodiment.

FIG. 3 is a configuration diagram illustrating a latent heat storage window 2 according to the second embodiment. As illustrated in FIG. 3, the latent heat storage window 2 according to the second embodiment includes the two sheets of the plate material 10, the peripheral end member 20, and the cell array plate material 30. These are the same as those of the first embodiment.

In the second embodiment, the latent heat storage material PCM in the plurality of cells S may not include the component that has magnetism and is dispersed.

Figure 4:
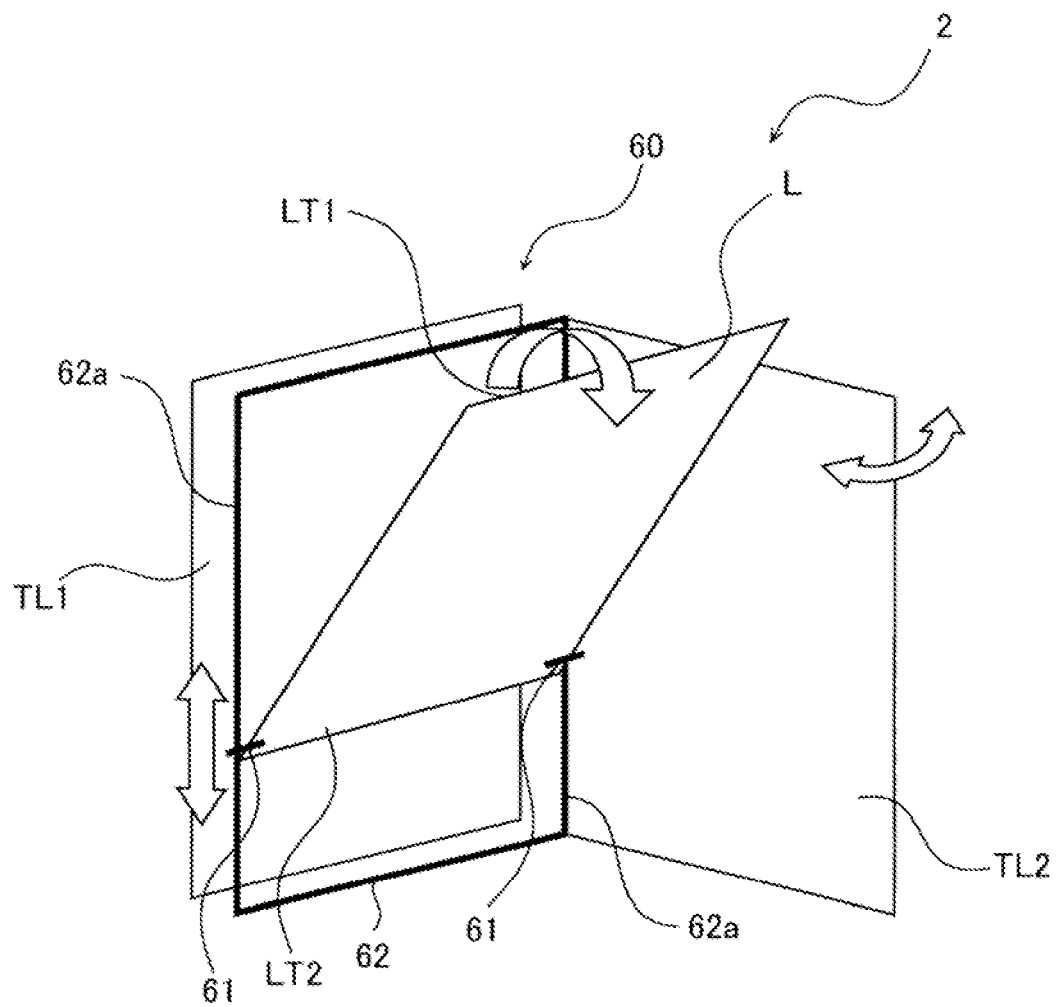
FIG. 4 is a perspective view illustrating the latent heat storage window according to the second embodiment, and illustrates a rotation mechanism.

FIG. 4 is a perspective view illustrating the latent heat storage window 2 according to the second embodiment, and illustrates a rotation mechanism. In the following description, a configuration of the latent heat storage window 2 (two sheets of the plate material 10, peripheral end member 20, and cell array plate material 30) excluding a rotation mechanism (operation unit) 60 is referred to as a laminated body L.

As illustrated in FIG. 4, the latent heat storage window 2 includes a transparent louver TL1 also referred to as a jalousie window on the outdoor side of the laminated body L. The latent heat storage window 2 includes an indoor louver TL2 on the indoor side of the laminated body L. The latent heat storage window 2 according to the second embodiment includes the rotation mechanism 60. The rotation mechanism 60 is capable of performing an operation by a user (rotation operation), and includes a pivot 61, a window frame 62, and a lock unit which is not illustrated, and the laminated body L can be half rotated without contacting the louvers TL1 and TL2.

More specifically, the pivot 61 is a rotary shaft member provided at any one of upper and lower end parts LT2 of the laminated body L. The above-described pivots 61 are respectively provided on the left and right sides of the laminated body L. The laminated body L is fitted to the window frame 62, and the laminated body L fitted to the window frame 62 is in a locked state in which a fitted state is maintained by the lock unit which is not illustrated. The pivot 61 is slidable with respect to left and right members 62a of the window frame 62. The indoor louver TL2 can be opened and closed in an indoor direction.

According to the above-described configuration, a rotation operation can be performed as follows. First, it is assumed that the pivot fir is located at a lower end of the window frame 62. From this state, the indoor louver TL2 is opened. Next, the lock unit is released, and an end part LT1 of the laminated body L on the side where the pivot 61 is not provided is pulled out to the indoor side. Next, an end part LT2 of the laminated body L on the side of the pivot 61 is slid upward with respect to the window frame 62. Thereafter, when the end part LT2 of the laminated body L reaches an upper end of the window frame 62, the laminated body L is fitted to the window frame 62 and locked by the lock unit. Finally, the indoor louver TL2 is closed.

Figure 6A:
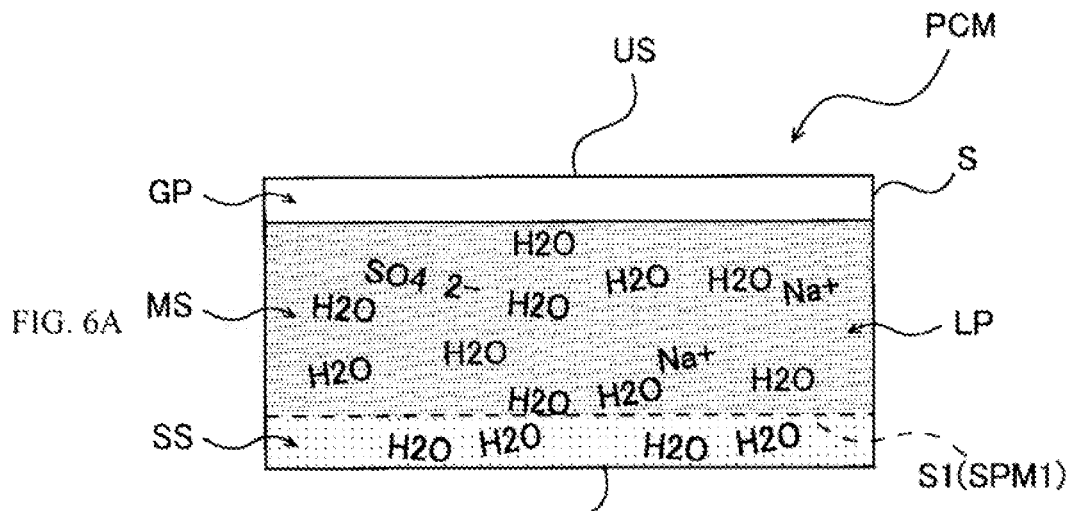
Figure 6B:
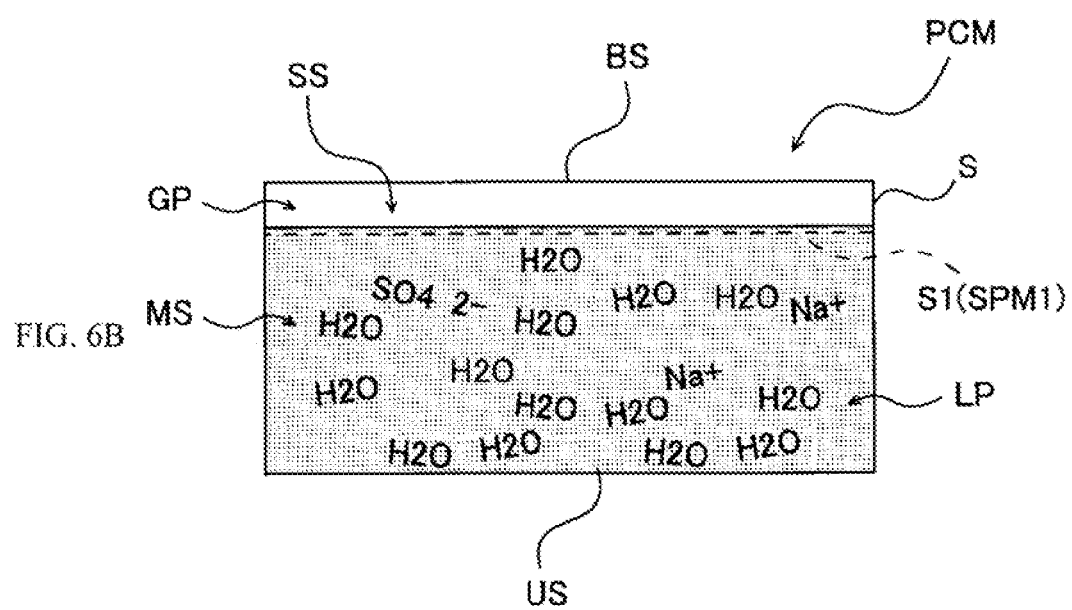

FIGS. 5A, 5B, 6A, and 6B are enlarged views illustrating one of the plurality of cells S according to the second embodiment, in which FIGS. 5A and 6A illustrate a non-rotated state and FIGS. 5B and 6B illustrate a rotated state. As illustrated in FIG. 5A, the latent heat storage window 2 according to the second embodiment includes a membrane member (uneven distribution unit) S1 inside the cell S. The membrane member S1 is an ion exchange membrane (uneven distribution unit, membrane member) IEM1 that causes a permeation speed of a specific ion and that of another ion to be different from each other. As illustrated in FIG. 6A, the membrane member S1 may be formed of a semipermeable membrane (uneven distribution unit, membrane member) SPM1 that causes a permeation speed of the ion and that of water to be different from each other.

Here, the membrane member S1 is provided at a position separated in a height direction in the cell S. More specifically, the membrane member S1 is provided at a position close to an upper face US (or lower face BS) of the cell S, and partitions the inside of the cell S into a small space SS and a main space MS. As illustrated in FIGS. 5B and 6B, even though the laminated body L is half rotated in the vertical direction by the rotation mechanism 60, the membrane member S1 is provided at a position where the membrane member S1 remains immersed when the latent heat storage material PCM is in the liquid state.

Next, function of the latent heat storage window 2 according to the second embodiment will be described with reference to FIGS. 5A and 5B. In the example illustrated in FIGS. 5A and 5B, the latent heat storage material PCM has three components of $Na_2SO_4$, NaCl, and water, and specifically, is a eutectic crystal type•eutectic type heat storage material in which NaCl which is a freezing point depressant is added to $Na_2SO_4.10H_2O$.

First, in the winter, the cell S is oriented as illustrated in FIG. 5A. That is, the ion exchange membrane IEM1 is located on the lower side. Here, the ion exchange membrane IEM1 is, for example, a monovalent ion selective permeable anion exchange membrane. Therefore, a chlorine ion and water can permeate the ion exchange membrane IEM1, and the chlorine ion and the water are located in the small space SS. Therefore, sodium sulfate (specific component) is unevenly distributed in the main space MS, and thus in the main space MS, the concentration of the freezing point depressant becomes relatively low with respect to the latent heat storage material PCM. Here, in the heat storage material referred to as the eutectic crystal type•eutectic type, a freezing point depression degree is affected by the concentration of the freezing point depressant (second component of the eutectic crystal type•eutectic type) with respect to the heat storage material (first component of the eutectic crystal type•eutectic type). From this point, the freezing point of the latent heat storage material PCM in the cell S can be increased to, for example, about 26° C., thereby making it possible to obtain the latent heat storage window 2 for the winter that provides a temperature control effect of heating the indoor side.

On the other hand, for example, in the summer, the laminated body L is half rotated in the vertical direction by using the rotation mechanism 60 as illustrated in FIG. 4 while maintaining the left and right positions of the laminated body L. In this case, the result is shown as illustrated in FIG. 5B. That is, most of the small space SS becomes the gas phase GP. Most of the chlorine ion and the water existing in the small space SS in FIG. 5A shift to the main space MS. As a result, the concentration of the freezing point depressant in the main space MS becomes relatively high with respect to the latent heat storage material PCM. Here, in the heat storage material referred to as the eutectic crystal type•eutectic type, since the freezing point depression degree is affected by the concentration of the freezing point depressant with respect to the heat storage material, the freezing point of the latent heat storage material PCM in the cell S can be lowered to, for example, about 18° C., thereby making it possible to obtain the latent heat storage window 2 for the summer that provides a temperature control effect of cooling the indoor side.

Function of the latent heat storage window 2 according to the second embodiment will be described with reference to FIGS. 6A and 6B. In the example illustrated in FIGS. 6A and 6B, the latent heat storage material PCM has two components of $Na_2SO_4.10H_2O$ and excess water, and more specifically, is an aqueous solution of $Na_2SO_4. 10H_2O$ (heat storage material of dissolution precipitation type). In addition thereto, NaCl which is the freezing point depressant may be added thereto.

First, in the winter, the cell S is oriented as illustrated in FIG. 6A. That is, the semipermeable membrane SPM1 is in a state of being located on the lower side. Here, since the semipermeable membrane SPM1 has a significantly low ion permeation speed, water is located in the small space SS, and the sodium sulfate is unevenly distributed in the main space MS, thereby increasing its concentration. Here, since a freezing point of the heat storage material of the dissolution precipitation type increases as water concentration increases, the freezing point of the latent heat storage material PCM in the cell S can be increased to, for example, about 26° C., thereby making it possible to obtain the latent heat storage window 2 for the winter that provides the temperature control effect of heating the indoor side.

On the other hand, in the summer, the laminated body L is half rotated in the vertical direction by using the rotation mechanism 60 as illustrated in FIG. 4 while maintaining the left and right positions of the laminated body L. In this case, the result is shown as illustrated in FIG. 6B. That is, most of the small space SS becomes the gas phase GP. Most of the water existing in the small space SS in FIG. 6A shifts to the main space MS. As a result, the water content in the main space MS increases, and thus the concentration of the sodium sulfate becomes lowered. Here, since the freezing point of the heat storage material of the dissolution precipitation type is lowered as the water concentration is lowered, the freezing point of the latent heat storage material PCM in the cell S can be lowered to, for example, about 18° C., thereby making it possible to obtain the latent heat storage window 2 for the summer that provides the temperature control effect of cooling the indoor side.

As described above, according to the latent heat storage window 2 of the second embodiment, in the same manner as that of the first embodiment, the melting point and the freezing point of the latent heat storage material PCM can be changed.

The rotation operation is performed when the melting point and freezing point of the latent heat storage material PCM are changed, such that even though precipitate is generated by using the latent heat storage material PCM for a long period of time and thus deterioration in a heat storage capacity occurs, the precipitate can be broken by the rotation operation, thereby making it possible to recover the heat storage capacity.

The latent heat storage window 2 according to second embodiment includes the membrane member S1 that is provided in the plurality of cells S at a position biased in the height direction and separates the inside into the small space SS and the main space MS. Therefore, the concentrations of the freezing point depressant and the latent heat storage material PCM on the upper and lower sides of the membrane member S1 are changed by the vertical rotation, thereby making it possible to chime the melting point and the freezing point of the latent heat storage material PCM.

Next, a third embodiment of the present invention will he described. A latent heat storage window according to the third embodiment has the following configuration. Hereinafter, in the description of the third embodiment, the same or similar elements as those of the second embodiment will be denoted by the same reference signs.

FIGS. 7A, 7B, 8A, and 8B are enlarged views illustrating one of the plurality of cells S according to the third embodiment, in which FIGS. 7A and 8A illustrate a non-rotated state and FIGS. 7B and 8B illustrate a rotated state. As illustrated in FIG. 7A, a second membrane member (uneven distribution unit) S2 is further provided inside the cell S. The second membrane member S2 is the same as the membrane member S1, is a second ion exchange membrane (uneven distribution unit, second membrane member) IEM2 in the example illustrated in FIGS. 7A and 7B, and is a second semipermeable membrane (uneven distribution unit, second membrane member) SPM2 in the example illustrated in FIGS. 8A and 8B.

The second membrane member S2 forms a second small space SS2 substantially symmetrical to the small space SS formed by the membrane member S1 in the height direction. That is, when the small space SS is provided at a position close to the lower face BS of the cell S, the second membrane member S2 is provided at a position close to the upper face US of the cell S, and the volume of the small space. SS is substantially the same as the volume of the second small space SS2. Accordingly, in the same manner as that of the membrane member S1, the second membrane member S2 remains immersed when the latent heat storage material PCM is in the liquid state even though the laminated body L is half rotated in the vertical direction by the rotation mechanism 60.

Next, function of the latent heat storage window 2 according to the third embodiment will be described with reference to FIGS. 7A and 7B. In the example illustrated in FIGS. 7A and 7B, the latent heat storage material PCM has three components of $Na_2SO_4$, NaCl, and water, and specifically, is a eutectic crystal type•eutectic type heat storage material in which NaCl which is the freezing point depressant is added to $Na_2SO_4.10H_2O$. In the example illustrated in FIGS. 7A and 7B, the membrane member S1 and the second membrane member S2 are the ion exchange membranes IEM1 and IEM2 (monovalent ion selective permeable anion exchange membranes) that causes a permeation speed of a specific ion and that of another ion to he different from each other.

First, as illustrated in FIG. 7A, it is assumed that the ion exchange membrane IEM1 is located below the second ion exchange membrane. IEM2. In this case, the chlorine ion exists in the main space MS and the small space SS, and a sulfate ion should exist only in the main space MS. However, when the sulfate ion is left for a long time in the state illustrated in FIG. 7A, the sulfate ion also passes through the ion exchange membrane IEM1 and moves to the small space SS. Therefore, the main space MS and the small space SS have substantially the same composition.

Then, when the rotation mechanism 60 is used to perform half rotation in the vertical direction, the result is shown as illustrated in FIG. 7B. In this case, the chlorine ion and the water permeate the ion exchange membrane IEM1 and move to the main space MS. On the other hand, the sulfate ion should be difficult to permeate the ion exchange membrane IEM1 in principle, but since the volume of the aqueous solution in the small space SS is dramatically reduced, the concentration of the sulfate ion in the small space SS unexpectedly appears and increases, such that the sulfate ion also flows out into the main space MS at a suitable speed.

The water and the chlorine ion flow out from the main space MS to the second small space SS2. With respect to the sulfate ion in the main space MS, since a concentration difference of the sulfate ion between the main space MS and the second small space SS2 is not significant, the sulfate ion hardly permeates the second ion exchange membrane IEM2. As a result, the sodium sulfate is in a state of being unevenly distributed in the main space MS, such that the concentration of the freezing point depressant in the main space MS becomes relatively high with respect to the latent heat storage material PCM.

Here, in the heat storage material referred to as the eutectic crystal type•eutectic type, since the freezing point depression degree is affected by the concentration of the freezing point depressant with respect to the heat storage material, in the same manner as that of the state illustrated in FIG. 5A, the state illustrated in FIG. 7B can he used as the latent heat storage window 2 for the winter that provides the temperature control effect of heating the indoor side.

Next, function of the latent heat storage window 2 according to the third embodiment will be described with reference to FIGS. 8A and 8B. In the example illustrated in FIGS. 8A and 8B, the latent heat storage material PCM has three components of $Na_2SO_4$, NaCl, and water, and specifically, is obtained by adding NaCl which is the freezing point depressant to $Na_2SO_4.10H_2O$ (heat storage material of dissolution precipitation type).

First, as illustrated in FIG. 8A, it is assumed that the semipermeable membrane SPM1 is located below the second semipermeable membrane SPM2. In this case, the water exists in the small space SS, and the chlorine km and the sulfate ion should exist only in the main space MS. However, when the chlorine ion and the sulfate ion are left for a long time in the state illustrated in FIG. 8A, the chlorine ion and the sulfate ion also permeate the semipermeable membrane SPM1 and move to the small space SS. Therefore, the main space MS and the small space SS have substantially the same composition.

Then, when the rotation mechanism 60 is used to perform half rotation in the vertical direction, the result is shown as illustrated in FIG. 8B. In this case, the water permeates the semipermeable membrane SPM1 and moves to the main space MS. On the other hand, the chlorine ion and the sulfate ion should he difficult to permeate the semipermeable membrane SPM1 in principle, but since the volume of the aqueous solution in the small space SS is dramatically reduced, the concentrations of the chlorine ion and the sulfate ion in the small space SS are significantly increased, such that the chlorine ion and the sulfate ion flow out into the main space MS at a suitable speed.

The water flows out from the main space MS to the second small space SS2. With respect to the chlorine ion and the sulfate ion in the main space MS, since a concentration difference of the chlorine ion and a concentration difference of the sulfate ion between the main space MS and the second small space SS2 are not significant, the chlorine ion and the sulfate ion hardly permeate the second semipermeable membrane SPM2. As a result, the sodium sulfate is unevenly distributed in the main space MS.

Here, since the freezing point of the heat storage material of the dissolution precipitation type increases as the water concentration increases, in the same manner as that of the state illustrated in FIG. 6A, the state illustrated in FIG. 8B can be the latent heat storage window 2 for the winter that provides the temperature control effect of heating the indoor side.

As described above, according to the latent heat storage window 2 of the third embodiment, in the same manner as that of the second embodiment, it is possible to change the melting point and the freezing point of the latent heat storage material PCM. The precipitate can he broken by the rotation operation, and the heat storage capacity can be recovered. The concentrations of the freezing point depressant and the latent heat storage material PCM above and below the membrane member S1 are changed, thereby making it possible to change the melting point and the freezing point of the latent heat storage material PCM.

The latent heat storage window 2 according to the third embodiment further includes the second membrane member S2 that forms the second small space SS2 substantially symmetrical to the small space SS in the height direction, and the second membrane member S2 is formed of the same material as that of the membrane member S1. Therefore, for example, even when the inside of the cell S becomes the same component across the membrane member S1 by leaving the cell S for a long period of time, the concentrations of the freezing point depressant and the latent heat storage material above and below the second membrane member S2 are changed by the vertical rotation, thereby making it possible to change the melting point and the freezing point of the latent heat storage material.

Next, a fourth embodiment of the present invention will be described. A latent heat storage window according to the fourth embodiment has the following configuration. Hereinafter, in the description of the fourth embodiment, the same or similar elements as those of the first embodiment will be denoted by the same reference signs.

Figure 9A:
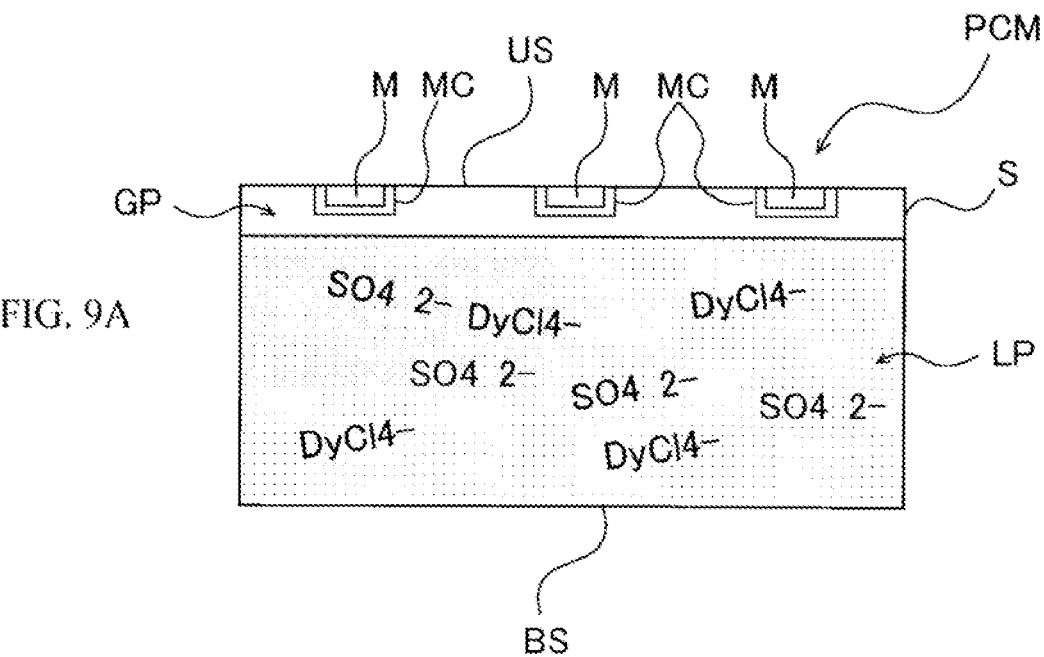
Figure 9B:
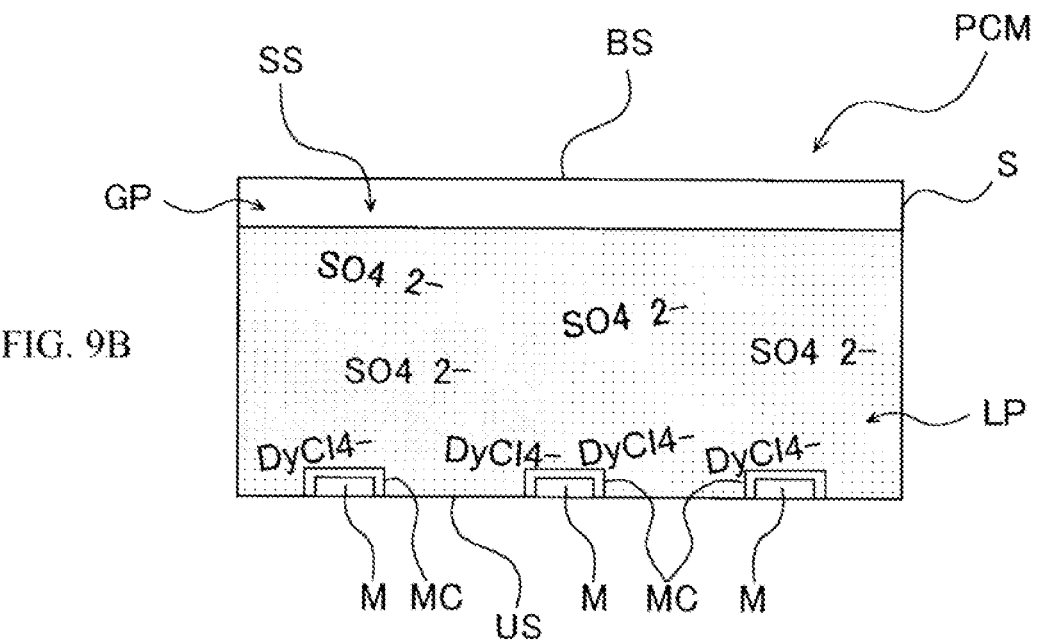
Figure 10A:
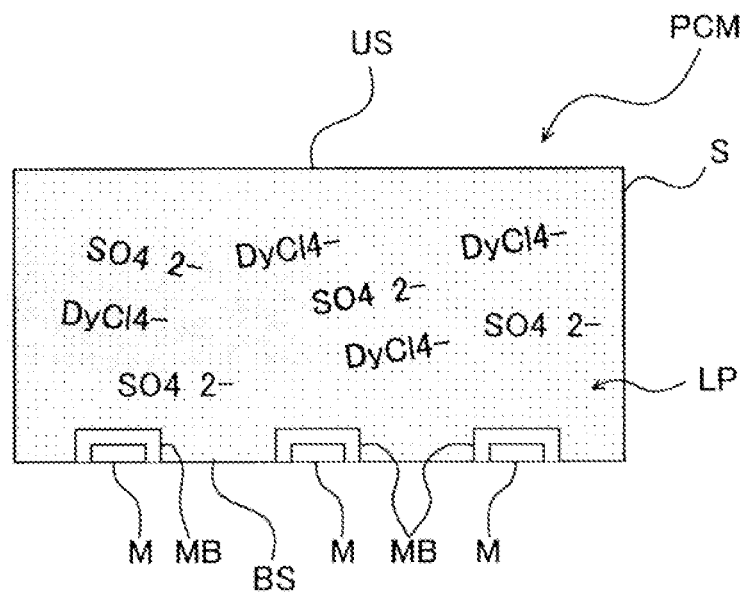
Figure 10B:
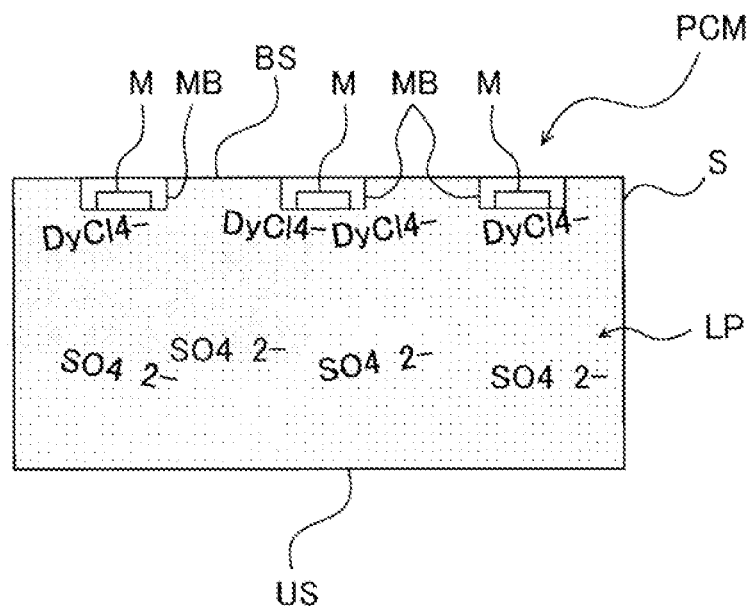

FIGS. 9A, 9B, 10A, and 10B are enlarged views illustrating one of the plurality of cells S according to the fourth embodiment, in which FIGS. 9A and 10A illustrate a non-rotated state and FIGS. 9B and 10B illustrate a rotated state. As illustrated in FIG. 9A, a magnet (uneven distribution unit and magnetic material) M is provided inside the cell S. The magnet M is housed in a magnet cover MC. The magnet cover MC is provided at a position biased in the height direction in the cell S (upper face US in FIGS. 9A and 9B), and is located in the gas phase GP in the non-rotated state illustrated in FIG. 9A. On the other hand, in the rotated state illustrated in FIG. 9B, the magnet cover MC (magnet M) is in a state of being immersed in the liquid phase LP.

As illustrated in FIG. 10A, the cell S may not have the gas phase GP inside. In this example, the magnet M is housed in a magnet case MB. The magnet case MB has a cavity inside and prevents the latent heat storage material PCM from entering the inside thereof. The magnet case MB is attached to the lower face BS. The magnet M is located on the side of the lower face BS of the magnet case MB in the non-rotated state illustrated in FIG. 10A, and is located on the side of the upper face US of the magnet case MB in the rotated state illustrated in FIG. 10B. The magnet case MB may he attached to the upper face US.

In the fourth embodiment, the latent heat storage material PCM has the component that has magnetism and is dispersed as the freezing point depressant. The above-described freezing point depressant is the same as that described in the first embodiment. Hereinafter, $DyCl_4^-$ having the same magnetism as that of the first embodiment will be described.

Function of the latent heat storage window 2 according to the fourth embodiment will be described with reference to FIGS. 9A and 9B. In the example illustrated in FIGS. 9A and 9B, it is assumed that the latent heat storage material PCM is a magnetic type heat storage material in which a dysprosium tetrachloride ion ($DyCl_4^-$) which is a freezing point depressant is added to $Na_2SO_4.10H_2O$.

First, in the summer, the cell S is oriented as illustrated in FIG. 9A. That is, the magnet M is in a state of being located in the gas phase GP Here, since the magnet M located in the gas phase GP, the dysprosium tetrachloride ion ($DyCl_4^-$) is in a state of being dispersed in the liquid phase LP. Accordingly, the freezing point depressant is appropriately caused to act, whereby the freezing point of the latent heat storage material PCM in the cell S can be lowered to, for example, about 18° C., thereby making it possible to obtain the latent heat storage window 2 for the summer that provides the temperature control effect of cooling the indoor side.

On the other hand, for example, in the winter, the laminated body L is half rotated in the vertical direction by using the rotation mechanism 60 as illustrated in FIG. 4 while maintaining the left and right positions of the laminated body L. In this case, the result is shown as illustrated in FIG. 9B. That is, since the magnet M is located in the liquid phase LP, the dysprosium tetrachloride ion ($DyCl_4^-$) is attracted to the magnet M and becomes a state of being concentrated in the vicinity of the magnet M. As a result, the concentration of the freezing point depressant becomes low at a portion excluding the vicinity of the magnet M. Therefore, the freezing point of the latent heat storage material PCM in the cell S can be increased to, for example, about 26° C., thereby making it possible to obtain the latent heat storage window 2 for the winter that provides the temperature control effect of heating the indoor side.

Function of the latent heat storage window 2 according to the fourth embodiment will be described with reference to FIGS. 10A and 10B. Even in the example illustrated in FIGS. 10A and 10B, the latent heat storage material PCM is assumed to be the magnetic type heat storage material in which $DyCl_4^-$ which is the freezing point depressant is added to $Na_2SO_4.10H_2O$.

First, in the summer, the cell S is oriented as illustrated in FIG. 10A. That is, the magnet case MB is located on the lower side in the cell S, and the magnet M is located on the lower side in the magnet case MB. At this time, the magnet M and the latent heat storage material PCM are in a state of being separated from each other by a distance of the cavity of the magnet case MB, and a magnetic three of the magnet Ni becomes difficult to reach the latent heat storage material PCM. Therefore, the dysprosium tetrachloride ion ($DyCl_4^-$) is in a state of being dispersed in the liquid phase LP. As a result, the freezing point depressant is appropriately caused to act, whereby the freezing point of the latent heat storage material PCM in the cell S can be lowered to, for example, about 18° C., thereby making it possible to obtain the latent heat storage window 2 for the summer that provides the temperature control effect of cooling the indoor side.

On the other hand, in the winter, the laminated body L is half rotated in the vertical direction by using the rotation mechanism 60 as illustrated in FIG. 4 while maintaining the left and right positions of the laminated body L. In this case, the result is shown as illustrated in FIG. 10B. That is, the magnet case MB is located on the upper side in the cell S, and the magnet M is located on the lower side of the magnet case MB. At this time, a distance between the magnet M and the latent heat storage material PCM is equal to a thickness of the magnet case MB, and the magnetic force of the magnet M easily reaches the latent heat storage material PCM. Accordingly, the dysprosium tetrachloride ion (DyCl₄⁻) is attracted to the magnet M and becomes a state of being concentrated in the vicinity of the magnet M. As a result, the concentration of the freezing point depressant becomes low at a portion excluding the vicinity of the magnet M. Therefore, the freezing point of the latent heat storage material PCM in the cell S can be increased to, for example, about 26° C., thereby making it possible to obtain the latent heat storage window 2 for the winter that provides the temperature control effect of heating the indoor side.

As described above, according to the latent heat storage window 2 of the fourth embodiment, in the same manner as that of the second embodiment, the melting point and the freezing point of the latent heat storage material PCM can be changed. The precipitate can be broken by the rotation operation, thereby making it possible to recover the heat storage capacity.

According to the fourth embodiment, since the magnet M is provided and the latent heat storage material PCM includes a component such as dysprosium tetrachloride that has magnetism and is dispersed, it is possible to cause the component that has magnetism and is dispersed to be concentrated in the magnet M, thereby making it possible to change the melting point and the freezing point of the latent heat storage material PCM.

Next, a fifth embodiment of the present invention will be described. A latent teat storage window according to the fifth embodiment has the following configuration. Hereinafter, in the description of the fifth embodiment, the same or similar elements as those of the first embodiment will he denoted by the same reference signs.

Figure 11:
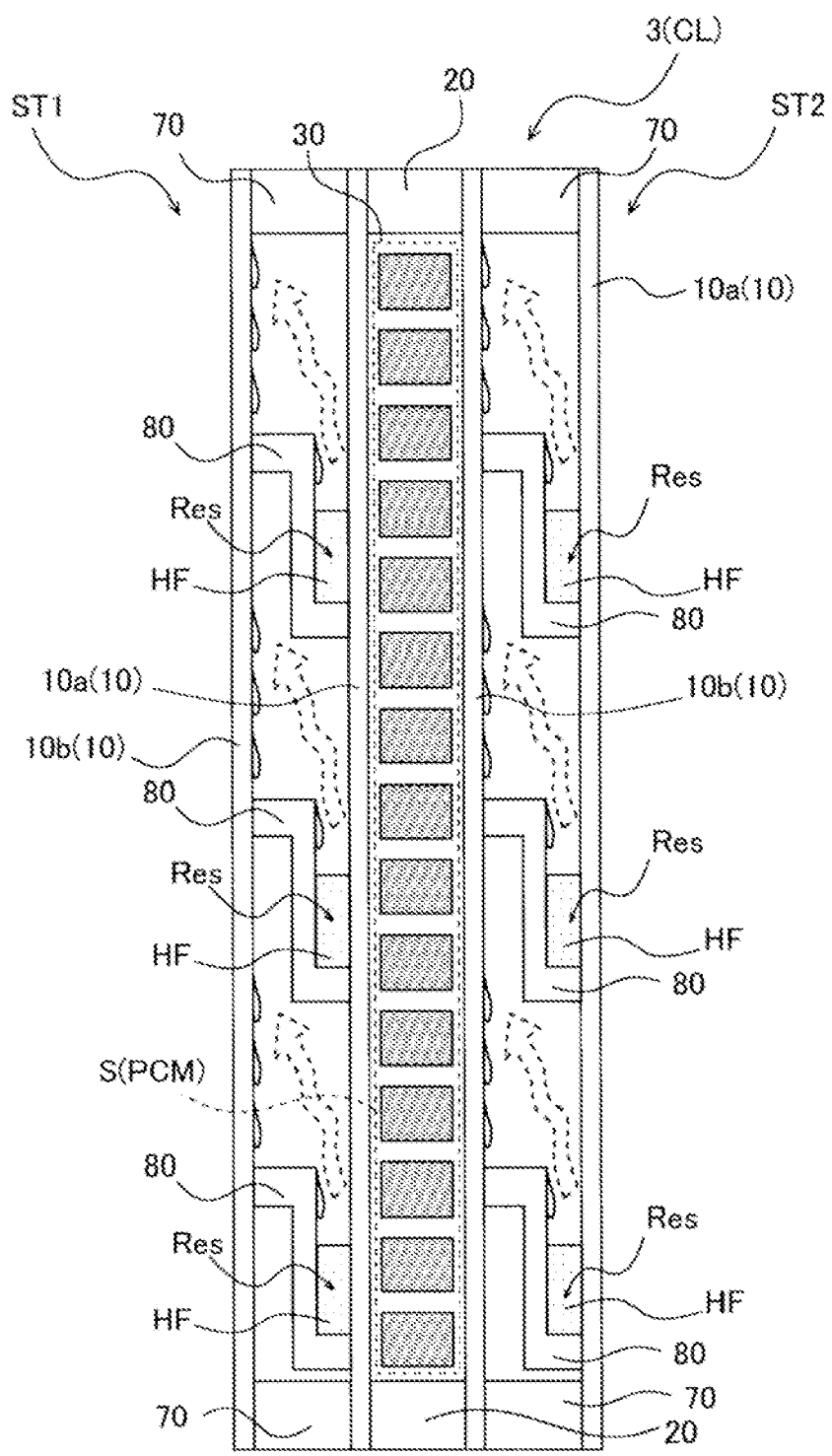
FIG. 11 is a cross-sectional view illustrating a latent heat storage window according to a fifth embodiment.

FIG. 11 is a cross-sectional view illustrating a latent heat storage window according to the fifth embodiment. As illustrated in FIG. 11, a latent heat storage window 3 according to the fifth embodiment has a configuration in which the cell array plate material 30 and the peripheral end member 20 described in the second embodiment are sandwiched between first and second structures ST1 and ST2, and thus are interposed therebetween.

The first and second structures ST1 and ST2 respectively include roughly two sheets of the plate material 10, a vacuum peripheral end member 70, slopes 80, and hydraulic fluid (liquid) HF.

The two sheets of the plate material 10 are transparent plate materials disposed substantially in parallel with each other. These plate materials 10 are formed of, for example, a glass material that makes water vapor impermeable. The vacuum peripheral end member 70 is interposed between the two sheets of the plate material 10 at the peripheral end parts of the two sheets of the plate material 10. An internal space formed by the two sheets of the plate material 10 and the vacuum peripheral end member 70 is in a vacuum state from a viewpoint of heat insulation. The internal space is not limited to the vacuum state, but may be filled with a predetermined gas.

The slope 80 is a transparent member interposed between the two sheets of the plate material 10, and is folded at 90 degrees twice to form a bent body having an approximately N-shaped cross section in the cross sectional view state illustrated in FIG. 11. In the slope 80, one end part 80a (which will be described later and refer to FIG. 12) is provided to be in contact with an inner wall of the first plate material one plate material) 10a, and the other end part 80b (which will he described later and refer to FIG. 12) is provided to be in contact with an inner wall of the second plate material (the other plate material) 10b. The above-described slope 80 with the first plate material 10a on one end side configures a storage part Res that can store the hydraulic fluid HF together.

Figure 12:
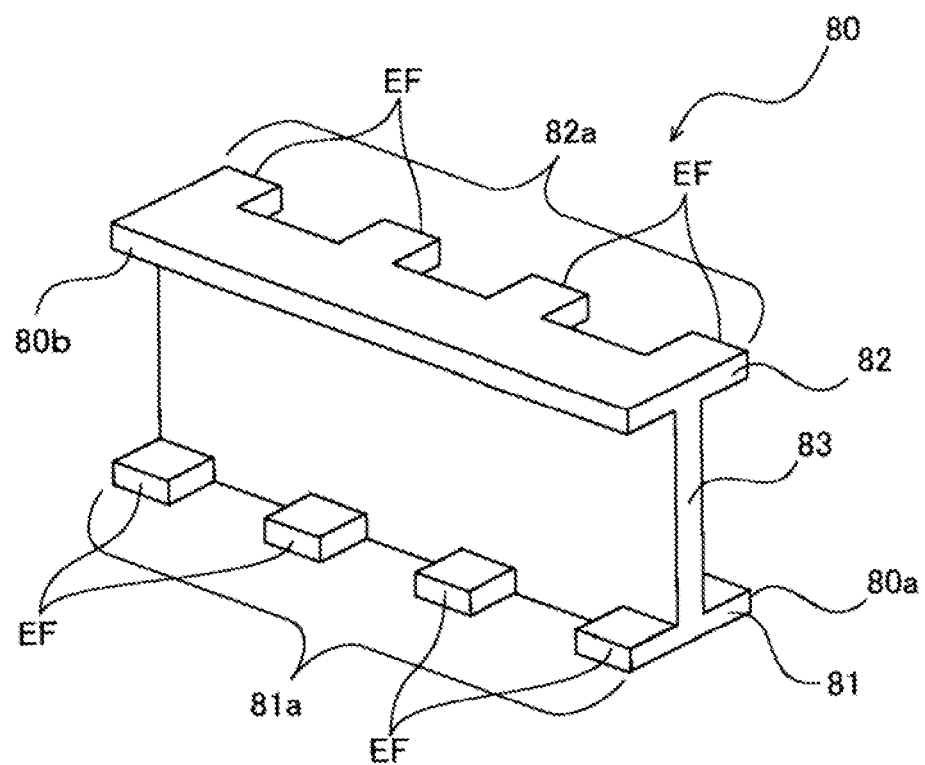
FIG. 12 is a perspective view illustrating details of a slope illustrated in FIG. 11.

FIG. 12 is a perspective view illustrating details of the slope 80 illustrated in FIG. 11. As illustrated in FIG. 12, the slope 80 includes a lower plate 81, an upper plate 82 disposed in parallel with the lower plate 81, and a connection plate 83 connecting the lower plate 81 and the upper plate 82.

The lower plate 81 has the above-described end part 80a, and the opposite side of the end part 80a is formed as a comb tooth part 81a protruding in a comb tooth shape. Each end face EF of the comb tooth part 81a becomes a portion that contacts the inner wall of the second plate material 10b. The upper plate 82 has a point symmetrical structure with the lower plate 81 with the connection plate 83 interposed therebetween. That is, the upper plate 82 is formed as a comb tooth part 82a protruding in a comb tooth shape on the side opposite to the end part 80b, and each end face EF of the comb tooth part 82a is a portion that contacts the inner wall of the first plate material 10a. In this manner, the opposite end parts (end part 80a and end face EF) of the lower plate 81 of the slope 80 and the opposite end parts (end part 80b and end face EF) of the upper plate 82 thereof respectively contact the two sheets of the plate material 10. Accordingly, the slope 80 supports the two sheets of the plate material 10 in the vacuum state from the inside thereof.

FIG. 11 is referred to again. In the embodiment, the hydraulic fluid HF is a transparent liquid such as water. The hydraulic fluid HF is not limited to water. The above-described hydraulic fluid HF is stored in the storage part Res. The hydraulic fluid. HF in the storage part Res can be evaporated by heat from the first plate material 10a. The evaporated hydraulic fluid HF becomes steam and reaches the second plate material 10b. The hydraulic fluid HF becoming steam is condensed and liquefied in the second plate material 10b. The liquefied hydraulic fluid HF flows down an inner face of the second plate material 10b and accumulates on the upper plate 82 of the slope 80 (refer to FIG. 12). When a certain amount or more of the hydraulic fluid HF accumulates on the upper plate 82, the hydraulic fluid HF falls into the storage part Res from a gap between the comb tooth parts 82a of the upper plate 82. Here, the first plate material 10a functions as an evaporator because the hydraulic fluid HF is evaporated, and the second plate material 10b functions as a condenser because the hydraulic fluid HF is condensed. Accordingly, the side of the first plate material 10a is cooled by being deprived of the evaporation heat, and condensation heat is discarded from the side of the second plate material 10b.

In the above-described latent heat storage window 3, the water (hydraulic fluid HF) is evaporated at a temperature of, for example, 21° C. or higher in the first plate material 10a of the second structure ST2. When the evaporated water (steam) touches the second plate material 10b, the evaporated water is cooled and liquefied, and returns to the storage part Res via the upper plate 82 of the slope 80. In this process, the side of the first plate material 10a is cooled by being deprived of the evaporation heat, and the condensation heat is discarded from the side of the second plate 10b. The condensation heat discarded from the side of the second plate material 10b is stored by the latent heat storage material PCM.

When the temperature on the side of the second plate material 10b of the first structure ST1 becomes lower than 21° C., the hydraulic fluid HF is evaporated in the storage part Res on the side of the first structure body ST1 by the heat stored in the latent heat storage material PCM, and the condensation heat is discarded from the side of the second plate material 10b.

As a result, the heat on the side of the second structure ST2 flows through the side of the first structure ST1 through the latent heat storage material PCM serving as a buffer. Accordingly, for example, in the summer, the indoor side becomes the second structure ST2, thereby making it possible to obtain a temperature control effect of cooling the indoor side without taking in moisture.

Particularly, the latent heat storage window 3 according to the fifth embodiment can obtain a cooling effect by using the latent heat storage material PCM, when the room temperature is, for example, equal to or higher than 21° C. even though the outside air temperature is high. That is, since the latent heat storage material PCM is fixed at 21° C., indoor heat can be transferred to the latent heat storage material PCM when the room temperature is equal to or higher than 21° C., such that the cooling effect can he obtained indoors. For example, the heat stored in the latent heat storage material PCM is discarded when the outside air temperature at night becomes equal to or lower than 21° C. Accordingly, the latent heat storage window 3 is provided with the latent heat storage material PCM as the buffer, thereby making it possible to increase the frequency of performing indoor comfort.

In the latent heat storage window 3, the slope 80 forms the storage part Res together with the first plate material 10a, but a heat transfer member may be attached to an inner face of the first plate material 10a, and the storage part Res may be formed together with the heat transfer member. That is, the slope 80 may form the storage part Res on the side of the first plate material 10a together with other members. In the embodiment, the hydraulic fluid HF reaches the second plate material 10b and is condensed and liquefied, but the present invention is not limited thereto, and the heat transfer member may be attached to the inner face of the second plate material 10b so that the hydraulic fluid HF may reach the heat transfer member and may be condensed and liquefied.

When the slope 80 has a liquid circulation structure that circulates the hydraulic fluid HF, the structure is not limited to the structure illustrated in FIGS. 11 and 12, and for example, may be a simple inclined structure (inclined structure inclined from the end part 80a toward the end part 80b).

The first plate material 10a may be a heat absorbing glass (glass containing metal such as iron in a glass composition) for improving evaporation ability. At least one inner face of the two sheets of the plate material 10 may be subjected to an infrared ray reflection treatment in order to improve heat insulation property during heat insulation.

Figure 13:
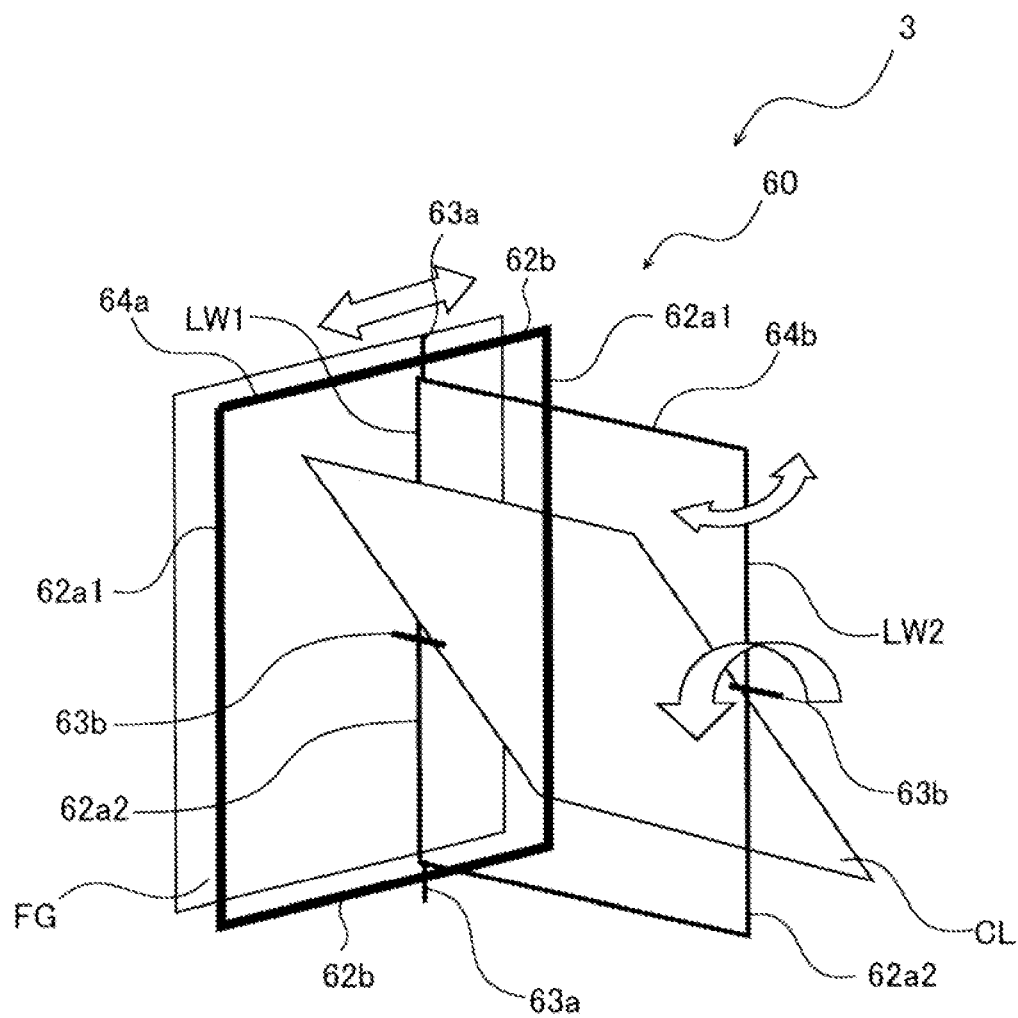
FIG. 13 is a perspective view illustrating the latent heat storage window according to the fifth embodiment, and illustrates a rotation mechanism.

The latent heat storage window 3 according to the fifth embodiment includes the rotation mechanism 60 as illustrated in FIG. 13, and is rotatable not only in the vertical direction but also in the horizontal direction orthogonal to the vertical direction.

FIG. 13 is a perspective view illustrating the latent heat storage window 3 according to the fifth embodiment, and illustrates the rotation mechanism 60. In the example illustrated in FIG. 13, a configuration of the latent heat storage window 3 excluding the rotation mechanism 60 (first and second structures ST1 and ST2, peripheral end member 20, and cell array plate material 30) is referred to as a composite laminated body (flat body) CL.

As illustrated in FIG. 13, the latent heat storage window 3 according to the fifth embodiment further includes a fixed glass FG on the outdoor side. Therefore, the latent heat storage window 3 illustrated in FIG. 13 is configured to be able to perform half rotation in the vertical and horizontal directions without causing the composite laminated body CL to contact the fixed glass FG.

In the example illustrated in FIG. 13, the rotation mechanism 60 includes a first pivot 63a, a second pivot 63b, a first window frame 64a, a second window frame 64b, and first and second lock units which are not illustrated.

The first window frame 64a is a rectangular frame fixed to the building side. The second window frame 64h is provided with the first pivot 63a at any one of left and right end parts LW1, and the first pivot 63a is slidable with respect to upper and lower members 62b of the first window frame 64a. The second pivot 63b is attached to an intermediate part in the height direction of the composite laminated body CL, and is rotatably provided at a central part of left and right members 62a2 of the rectangular second window frame 64b.

Therefore, the rotation operation can he performed as follows. First, it is assumed that the end part LW1 on the side of the first pivot 63a of the second window frame 64b is located on one of left and right members 62a1 of the first window frame 64a. From this state, the first lock unit is released, and an end part LW2 of the second window frame 64b on the side where the first pivot 63a is not provided is drawn out to the indoor side. Next, the second lock unit is released, and the composite laminated body CL is half rotated in the vertical direction centering on the second pivot 63b. Next, the composite laminated body CL is locked by the second lock unit. Next, the end part LW1 on the side of the first pivot 63a of the second window frame 64b is slid to the other side of the left and right members 62a1 of the first window frame 64a. Thereafter, the second window frame 64b is fitted into the first window frame 64a so that the end part LW2 of the second window frame 64b becomes one side of the left and right members 62a 1, and is locked by the first lock unit.

As described above, in the latent heat storage window 3 including the fixed glass on the outdoor side, the composite laminated body CL is rotatable in both vertical and horizontal directions.

As illustrated in FIG. 12, in the slope 80, since the shapes of the lower plate 81 and the upper plate 82 have the point symmetrical structure with the connection plate 83 interposed therebetween, the slope 80 forms the storage part Res even when the composite laminated body CL, is half rotated in the vertical direction. That is, when the composite laminated body CL is half rotated in the vertical direction, the storage part Res is formed by the upper plate 82 and the second plate material 10b.

Next, function of the latent heat storage window 3 according to the fifth embodiment will be described. First, as illustrated in FIG. 11, the first plate material 10a of the second structure ST2 becomes the indoor side, and the second plate material 10b of the first structure ST1 becomes the outdoor side.

In this state, for example, when the room temperature becomes equal to or higher than 21° C., the hydraulic fluid HF in the storage part Res is evaporated. The evaporated hydraulic fluid HF reaches the second plate material 10b on the outdoor side to be liquefied and flows down the inner face of the second plate material 10b. The flowing hydraulic fluid HF returns to the storage part Res again via the upper plate 82 of the slope 80. In this process, the first plate material 10a is cooled by the evaporation heat generated by the evaporation of the hydraulic fluid HF, and the condensation heat of the hydraulic fluid HF is discarded from the second plate material 10b. The discarded heat is stored by the latent heat storage material PCM. Accordingly the indoor side heat can be transferred to the latent heat storage material PCM, thereby making it possible to provide an air conditioning effect of cooling the indoor side.

With respect to the first structure ST1, when the outside air temperature is equal to or lower than 21° C., the hydraulic fluid HF repeats evaporation and condensation in the same manner as described above, such that the heat stored in the latent heat storage material PCM is discarded to the outside air.

When the composite laminated body CL is rotated in the horizontal direction while maintaining the vertical position of the composite laminated body CL by using the rotation mechanism 60 as illustrated in FIG. 13, art operation is reverse to the above description, and an air conditioning effect of heating the indoor side in the winter can be obtained. When the composite laminated body CL is rotated in the vertical and horizontal directions by using the rotation mechanism 60, an effect of breaking precipitate PR of the latent heat storage material PCM is further obtained, thereby recovering the heat storage amount.

As described above, according to the latent heat storage window 3 of the fifth embodiment, in the same manner as that of the second embodiment, the melting point and the freezing point of the latent heat storage material PCM can be changed. The precipitate can be broken by the rotation operation, thereby making it possible to recover the heat storage capacity. The concentrations of the freezing point depressant and the latent heat storage material PCM above and below the membrane member S1 are changed, thereby making it possible to change the melting point and the freezing point of the latent heat storage material PCM.

The latent heat storage window 3 according to the fifth embodiment includes the first and second structures ST1 and ST2 including the two sheets of the plate material 10, the storage part Res of the hydraulic fluid HF and the slope 80, and the cell array plate 30 is interposed therebetween. Therefore, first, when the hydraulic fluid HF is evaporated due to the heat on the side of the first plate material 10$a$ of the second structure ST2, the side of the first plate material 10$a$ is cooled by being deprived of the evaporation heat. On the other hand, when the evaporated hydraulic fluid HF reaches the side of the second plate material 10$b$, the evaporated hydraulic fluid HF is cooled to be condensed and liquefied, and the condensation heat is discarded from the side of the second plate material 10$b$. The same also applies to the first structure ST1. Therefore, the cooling effect can be provided in the indoor side.

Here, when one structure is used as a building element, as long as a temperature environment of both of the side of one plate material 10$a$ and the side of the other plate material 10$b$ of the structure is not adjusted, the heat does not flow from the side of one plate material 10$a$ to the side of the other plate material 10$b$. However, since the latent heat storage window 3 according to the fifth embodiment includes the cell array plate material 30 between the first and second structures ST1 and ST2, it is considered that the latent heat storage material PCM is provided as the buffer, and the temperature of the latent heat storage material PCM is kept constant. Therefore, for example, even though the outside air temperature is higher than the room temperature, the indoor heat can be transferred to the latent heat storage material PCM when the room temperature is equal to or higher than a specified temperature range, and the heat of the latent heat storage material PCM can be discarded to the outside air when the outside becomes cooler than a specific temperature range such as at night. As described above, the latent heat storage material PCM is provided as the buffer, thereby making it possible to increase the frequency of performing indoor comfort.

Since the rotation mechanism 60 is configured to he capable of performing at least half rotation in the horizontal direction, the rotation mechanism 40 is rotated in the horizontal direction when it is desired to change a direction of heat flow such as the summer and the winter, and day and night, whereby cooling or heating the indoor side can be selected.

Next, a sixth embodiment of the present invention will be described. A latent heat storage window according to the sixth embodiment has the following configuration. Hereinafter, in the description of the sixth embodiment, the same or similar elements as those of the first embodiment will be denoted by the same reference signs.

Figure 14:
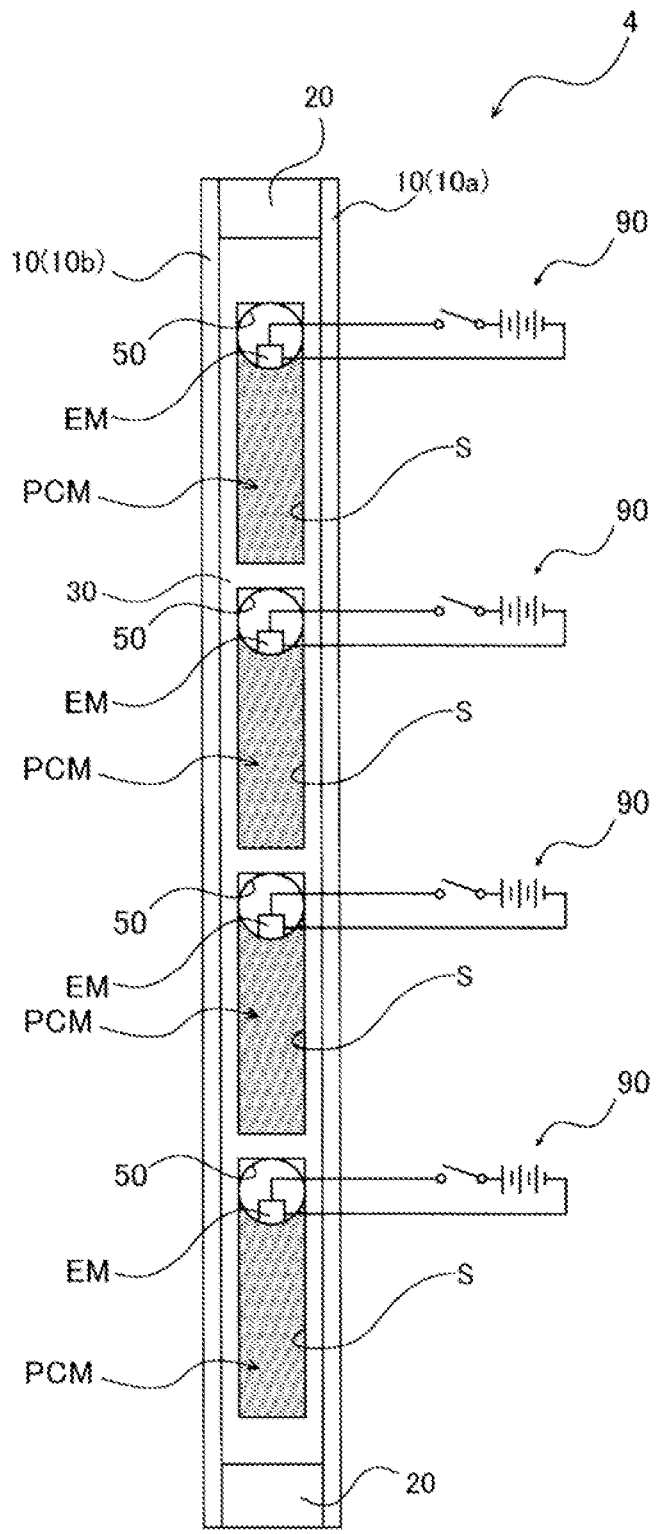
FIG. 14 is a configuration diagram illustrating a latent heat storage window according to a sixth embodiment.

FIG. 14 is a configuration diagram illustrating a latent heat storage window according to the sixth embodiment. As illustrated in FIG. 14, a latent heat storage window 4 according to the sixth embodiment includes the two sheets of the plate material 10, the peripheral end member 20, and the cell array plate material 30 described in the first embodiment together with the magnet cylinder 50 shown in the first embodiment at the upper part inside the cell S. An electromagnet EM is provided on the lower side in the magnet cylinder 50 which becomes the side of the latent heat storage material PCM.

The latent heat storage material PCM according to the sixth embodiment includes an energization part (operation unit) 90 for switching between an energized state with the electromagnet EM and a non-energized state therewith. The user can switch between a state of energizing the electromagnet EM and a state of interrupting the energization to the electromagnet EM by turning ON and OFF the energization part 90. At the time of energization by the energization part 90, a magnetic force from the electromagnet EM can act on the latent heat storage material PCM, and at the time of non-energization (when the energization is interrupted), the magnetic force can be prevented from acting thereon.

In the above-described latent heat storage window 4, at the time of energization by the energization part 90, the dysprosium tetrachloride ion ($DyCl_4^-$) which is a component having magnetism is unevenly distributed to the side of the electromagnet EM, whereby the concentration of the freezing point depressant is lowered at a portion excluding the vicinity of the electromagnet EM. As a result, the melting point and the freezing point of the latent heat storage material PCM (phase change temperature) can be increased to, for example, about 26° C., whereby the latent heat storage window 4 can function as that for the winter.

On the other hand, when the energization of the energization part 90 is interrupted, the dysprosium tetrachloride ion ($DyCl_4^-$) is in a state of being dispersed in the latent heat storage material PCM. Accordingly, the freezing point depressant is caused to act as usual, and the freezing point of the latent heat storage material PCM can be lowered to, for example, about 18° C., whereby the latent heat storage window 4 can function as that for the summer.

In this manner, according to the latent heat storage window 4 of the sixth embodiment, since the dysprosium tetrachloride ion ($DyCl_4^-$) which is the specific component is unevenly distributed in response to the operation by the user, it is possible not only to lower a specific component ratio at other portions excluding an uneven distribution portion but also to change the melting point and the freezing point of the latent heat storage material PCM, when uneven distribution is performed.

According to the sixth embodiment, the energization part 90 can be switched between the state of energizing the electromagnet EM and the state of interrupting the energization to the electromagnet EM. Therefore, it is not required to mount a complicated mechanism in the internal space between the two sheets of the plate material 10 and the peripheral end member 20, and it is not further required to rotate larger members such as the two sheets of the plate material 10, thereby making it possible to easily change the melting point and the freezing point of the latent heat storage material PCM.

As described above, while the present invention is described based upon the embodiments, the present invention is not limited to the above-described embodiments, modifications may be made within a range not departing from the spirit of the present invention, and technologies of different embodiments may be combined within a possible range. Further, publicly known or well-known technologies may be combined with in a possible range.

For example, in the embodiments, the rotation mechanism 60 illustrated in FIGS. 4 and 13 is shown, and the rotation mechanism 60 is not limited to the illustrated one. The latent heat storage window 2 according to each of the second to fourth embodiments may be able to perform half rotation in the horizontal direction.

The latent heat storage window 3 according to the fifth embodiment may be provided with a spray unit for spraying mist-like moisture. For example, when the mist-like moisture is sprayed on the second plate material 10*b* of the first structure ST1 in the state illustrated in FIG. 11, an effect of lowering the second plate material 10*b* up to near a dew point can be obtained even though the outside air temperature is high. As a result, a state similar to that when the outside air temperature becomes artificially lowered is created, thereby making it possible to allow the heat on the side of the latent heat storage material PCM to flow out of the room. Spraying may be performed when the first structure ST1 is located on the indoor side by the horizontal rotation of the rotation mechanism 60.

In the latent heat storage window 3 according to the fifth embodiment, while the configuration in which the structures ST1 and ST2 are provided on the opposite sides of the cell array plate material 30 is described, the present invention is not limited thereto, and may have one structure ST1 or ST2 on only one side.

In the above description, the component of the latent heat storage material PCM (component having magnetism) may be not only a component that generates latent heat, and a melting point•freezing point regulator, but also a dispersant and a nucleating agent.

In the above-described embodiment, the phase change temperature of the latent heat storage material PCM is changed in response to the operation of the user, but the present invention is not limited thereto, and for example, the phase change temperature of the latent heat storage material PCM may be automatically changed.

Figure 15:
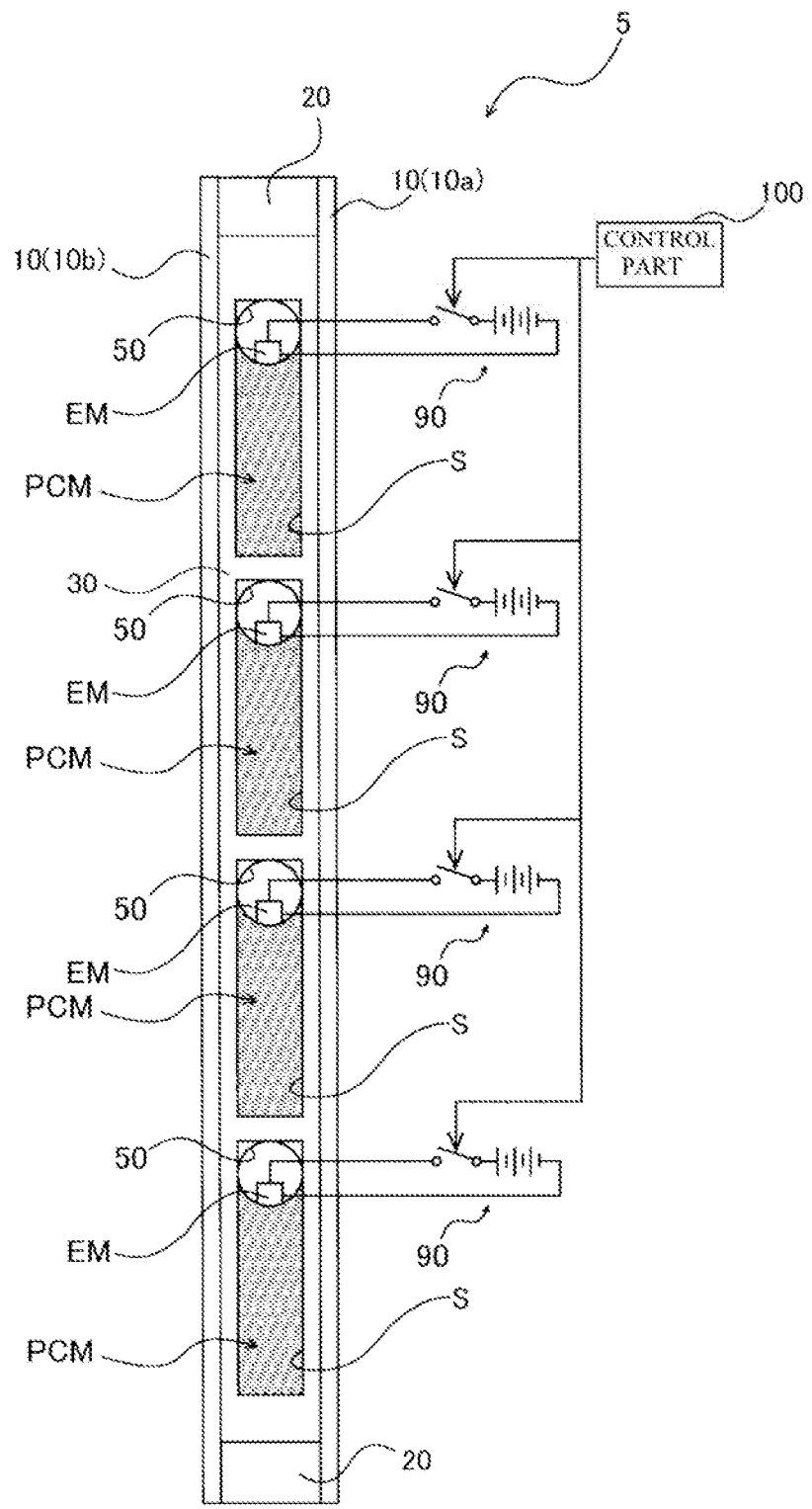
FIG. 15 is a configuration diagram illustrating a latent heat storage window according to a modification.

FIG. 15 is a configuration diagram illustrating a latent heat storage window according to a modification. A latent heat storage window 5 according to the modification is the same as the latent heat storage window 4 according to the sixth embodiment, but is different from the sixth embodiment in that a control part 100 is provided, and an energization part 90 is automatically controlled by the control part 100. The control part 100 can be configured by a CPU.

In the modification, the control part 100 includes, for example, calendar information, and can grasp the current month and date. Therefore, the control part 100 can determine the season based upon the current month and date, and when determining that the phase change temperature of the latent heat storage material PCM should be increased, the control part 100 sets the energization part 90 to an energized state. Accordingly, the magnetic force of the electromagnet EM acts on the latent heat storage material PCM, and the component having magnetism serving as the freezing point depressant is adsorbed to the electromagnet EM, thereby increasing the phase change temperature of the latent heat storage material PCM. On the other hand, when determining that the phase change temperature of the latent heat storage material PCM should be lowered, the control part 100 sets the energization part 90 to an interrupted state. As a result, the magnetic force of the electromagnet EM does not act on the latent heat storage material PCM, and the component having magnetism is dispersed in the latent heat storage material PCM, thereby lowering the phase change temperature of the latent heat storage material PCM. As described above, the phase change temperature of the latent heat storage material PCM can be optimized regardless of the operation of the user.

In the modification, for example, the energization part 90 is controlled based upon the calendar information, but the control is not limited thereto, and for example, the control part 100 may be linked to a cooling and heating device, may set the energization part 90 to the interrupted state during cooling, and may set the energization part 90 to the energized state during heating. The latent heat storage window 5 may include an illuminance sensor, and the control part 100 may calculate the daylight hours based upon a signal from the illuminance sensor to determine the season, and may control the energization part 90 based upon the determined season. In the same manner, the control part 100 can input weather information (even forecast information is available), and may control the energization part 90 by determining whether the latent heat storage material PCM should be set to a high temperature or a low temperature based upon the inputted weather information.

The control part 100 is not limited to controlling the energization part 90, but may control the operation mechanism 40. In this case, the control part 100 may control the movement of the external magnet 45 of the operation mechanism 40, may control the rotation of the upper and lower pulleys 41 and 42 without including the external magnet 45, and may directly control the rotation of the magnet cylinder 50.

What is claimed is:

1. a latent heat storage building element comprising: a cell array plate material including a plurality of cells that late a latent heat storage material including two or more components, one of the two or more components having magnetism and being dispersed in the latent heat storage material; an operation unit operable by a user; and an uneven distribution unit including a magnetic material configured to be switched between a first state and a second state, the first state being a state in which the magnetic material is relatively close to the latent heat storage material, and in which the magnetic material dispersed in the latent heat storage material is unevenly distributed in the latent heat storage material, the second state being a state in which the magnetic material is relatively far from the latent heat storage material, wherein the uneven distribution unit is configured to be switched between the first and second states when an operation is performed on the operation unit, the operation causing the cell array plate material to perform at least a half rotation in a vertical direction.

2. The latent heat storage building element according to claim 1, wherein the operation unit includes a cord member that operates in response to the operation by the user, and the magnetic material is connected to the cord member, and the operation unit is configured to be switched between the first state and the second state in response to an operation of the cord member.

3. The latent heat storage building element according to claim 1, wherein
the uneven distribution unit is configured to be in the second state before the cell array plate material is half rotated in the vertical direction, and is configured to be in the first state after the cell array plate material is half rotated in the vertical direction.

4. The latent heat storage building element according to claim 1, wherein
the magnetic material of the uneven distribution unit is an electromagnet, and
the operation unit is configured to be switched between the first and second states by energizing the electromagnet and interrupting the energization to the electromagnet.

5. The latent heat storage building element according to claim 1, wherein, the uneven distribution unit includes a first membrane member that is provided at a position biased in a height direction in a cell in the plurality of cells and separates inside of the cell into a first small space and a first main space, and the first membrane member includes either a member having a different permeation speed of a specific ion from a permeation speed of another ion, or a member having a different permeation speed of an ion from a permeation speed of water, and unevenly distributes the magnetic material dispersed in the latent heat storage material when the cell array plate material is half rotated in the vertical direction.

6. The latent heat storage building element according to claim 5, wherein
the uneven distribution unit further includes a second membrane member that forms a second small space substantially symmetrical to the first small space in the height direction in the first main space in the plurality of cells, and
the second membrane member includes the same material as that of the first membrane member.

7. The latent heat storage building element according to claim 5, further comprising:
first and second structures respectively including
two sheets of a plate material that form a third space sandwiched between the two sheets of the plate material,
liquid that is encapsulated between the two sheets of the plate material, and
a slope that forms a liquid circulation structure in which a storage part of the liquid is formed on one plate material side of the two sheets of the plate material, the liquid in the storage part being configured to be evaporated when heat of the one plate material side reaches the other plate material side, and the liquid being configured to be condensed on the other plate material side and be returned to the storage part, wherein
the cell array plate material is interposed between the first and second structures, and
the one plate material of the first structure and the other plate material of the second structure face each other.

8. The latent heat storage building element according to claim 7, wherein
the operation unit is configured to cause the cell array plate material together with the first and second structures to perform at least a half rotation in a horizontal direction orthogonal to the vertical direction.

* * * * *